(12) United States Patent
Herblot et al.

(10) Patent No.: US 12,135,759 B2
(45) Date of Patent: Nov. 5, 2024

(54) AUTOMATED CREATION AND DEPLOYMENT OF WEBSITES

(71) Applicant: Southend Technologies, Inc., Wilmington, DE (US)

(72) Inventors: Sébastien Herblot, Fresnois-la-Montagne (FR); Frederick Schiwek, Wasserbillig (LU)

(73) Assignee: Southend Technologies, Inc., Wilmington, DE (US)

( * ) Notice: Subject to any disclaimer, the term of this patent is extended or adjusted under 35 U.S.C. 154(b) by 69 days.

(21) Appl. No.: 17/792,481

(22) PCT Filed: Jan. 15, 2021

(86) PCT No.: PCT/US2021/013752
§ 371 (c)(1),
(2) Date: Jul. 13, 2022

(87) PCT Pub. No.: WO2021/146640
PCT Pub. Date: Jul. 22, 2021

(65) Prior Publication Data
US 2023/0039744 A1    Feb. 9, 2023

Related U.S. Application Data

(60) Provisional application No. 62/962,174, filed on Jan. 16, 2020.

(51) Int. Cl.
*G06F 9/455* (2018.01)
*G06F 8/61* (2018.01)
(Continued)

(52) U.S. Cl.
CPC .............. *G06F 16/986* (2019.01); *G06F 8/61* (2013.01); *G06F 8/71* (2013.01); *G06F 8/30* (2013.01);
(Continued)

(58) Field of Classification Search
CPC ........ G06F 16/986; G06F 16/958; G06F 8/61; G06F 8/71; G06F 8/38; G06F 8/34; G06F 8/30
See application file for complete search history.

(56) References Cited

U.S. PATENT DOCUMENTS

2004/0199867 A1* 10/2004 Brandenborg ......... G06Q 10/06
715/201
2007/0162845 A1   7/2007 Cave et al.
(Continued)

FOREIGN PATENT DOCUMENTS

KR   20070118753 A   12/2007
WO   2021/146640 A1   7/2021

OTHER PUBLICATIONS

Ahmed Abdulmahdi Hussein Al-Tameemi, Use of Content Management Systems in Business: A Comparison of Open Source Content Management Systems, May 2017, [Retrieved on Dec. 21, 2023]. Retrieved from the internet: <URL: http://earsiv.cankaya.edu.tr:8080/handle/20.500.12416/1982> 167 Pages (1-151) (Year: 2017).*

(Continued)

*Primary Examiner* — Anibal Rivera
(74) *Attorney, Agent, or Firm* — Lowe Graham Jones PLLC; Ellen M. Bierman

(57) ABSTRACT

Methods, systems, and techniques for deploying target websites, especially those created using a third party content management system ("CMS") for developing websites such as WORDPRESS are provided. Example embodiments provide a CMS Deployment System ("CDS") or CMS Deployment Application ("CDA"), which enables users to create content locally using all of the resources of the CMS and then manage and deploy the target website using a versioning process and in a more secure form on a target server. In one embodiment, the CDS/CDA exports the CMS website (Continued)

instance as flat HTML files, manages these files using a versioning system, and then deploys them on the target server without requiring user expertise. An example CDS/CDA includes an install facility, an export facility, and a deployment facility, which cooperate to deploy secure websites created using standard CMS tools.

22 Claims, 29 Drawing Sheets

(51) Int. Cl.
    *G06F 8/71*     (2018.01)
    *G06F 9/54*     (2006.01)
    *G06F 11/14*     (2006.01)
    *G06F 16/958*     (2019.01)
    *G06F 8/30*     (2018.01)
    *G06F 8/34*     (2018.01)
    *G06F 8/38*     (2018.01)

(52) U.S. Cl.
    CPC ............... *G06F 8/34* (2013.01); *G06F 8/38* (2013.01); *G06F 16/958* (2019.01)

(56) References Cited

U.S. PATENT DOCUMENTS

| | | | |
|---|---|---|---|
| 2007/0198667 A1* | 8/2007 | Behrendt | H04L 41/0846 709/220 |
| 2010/0251143 A1 | 9/2010 | Thomas et al. | |
| 2012/0317561 A1* | 12/2012 | Aslam | H04L 67/02 717/178 |
| 2013/0326333 A1* | 12/2013 | Hashmi | G06F 16/958 715/234 |
| 2019/0251148 A1 | 8/2019 | Hsu et al. | |

OTHER PUBLICATIONS

Jesper Ruuth, Website development project with Joomla 3 Content Management System, Oct. 2014, [Retrieved on Dec. 21, 2023] Retrieved from the internet: <URL: https://www.theseus.fi/bitstream/handle/10024/83245/RuuthJonJesper.pdf?sequence=1> 48 Pages (1-43) (Year: 2014).*

Mark Hills, Navigating the WordPress Plugin Landscape, 2016 IEEE, [Retrieved on May 6, 2024]. Retrieved from the internet: <URL: https://ieeexplore.ieee.org/stamp/stamp.jsp?tp=&arnumber=7503709> 10 Pages (1-10) (Year: 2016).*

International Search Report, issued in International Application No. PCT/US2021/013752 by International Bureau on Apr. 8, 2021.

International Preliminary Report on Patentability, issued in International Application No. PCT/US2021/013752 by International Bureau on Jul. 19, 2022.

Supplementary European Search Report issued in European Application No. 21741655.1 by the European Patent Office on Jan. 16, 2024.

Kirschnick, Thomas, "How to export a CMS based webflow site to a static site", Webflow Forum, Apr. 30, 2018, https://discourse.webflow.com/t/how-to-export-a-cms-based-webflow-site-to-a-static-site/57409, 5 pages.

Jackson, Brian, "WordPress vs static HTML: How Should You Build Your Site?", Kinsta, Nov. 16, 2018, https://web.archive.org/web/20181116022153/https://kinsta.com/blog/wordpress-vs-static-html/#, 23 pages.

Rutenberg, Guy, "Make Offline Mirror of a Site using 'wget'", Sep. 23, 2019, https://web.archive.org/web/20190923045259/https://www.guyrutenberg.com/2014/05/02/make-offline-mirror-of-a-site-using-wget/, 6 pages.

* cited by examiner

Fig. 3P

AUTOMATED CREATION AND DEPLOYMENT OF WEBSITES

CROSS-REFERENCE TO RELATED APPLICATIONS

This application is a 371 National Stage filing of PCT/US2021/013752, entitled "AUTOMATED CREATION AND DEPLOYMENT OF WEBSITES," filed Jan. 15, 2021; which claims the benefit of U.S. Provisional Patent Application No. 62/962,174, entitled "AUTOMATED CREATION AND DEPLOYMENT OF WEBSITES," filed Jan. 16, 2020, which applications are incorporated herein by reference in their entireties.

TECHNICAL FIELD

The present disclosure relates to methods, techniques, and systems for automatically deploying content for websites and, in particular, to methods, techniques, and systems for automatically deploying content from content management systems in a lightweight environment.

BACKGROUND

A content management system ("CMS") enables lay users to create websites with sophisticated textual and graphical content. For example, one such content management system environment, WORDPRESS, is very popular in part due to that it is distributed as "open source," and is thus free when one hosts one's own website (on your own server). Moreover, there are a large number of resources available, from plugins, to templates, tutorials, etc. for learning and deploying websites. From a user point of view, it's easy to install, setup, configure and customize. It allows external people to write content and allows the website administrator to assign them different roles (editors, contributors, etc.) depending upon need.

One of the disadvantages and problems of creating and deploying websites using WORDPRESS and other such CMS environments is that the software can be quite resource consuming as soon as one includes plugins, templates, or other resources. When a website supports a few hundred visitors a month, resource consumption may not really be an issue. However, when this number is exceeded, as common in production websites, resource consumption may become a problem leading to severe latency, poor performance, and the like. One solution is to purchase more powerful equipment. Another is to use cache systems which cache frequently used pages and resources. However, such solutions still require powerful servers to handle the traffic, which can be costly and in some cases cost prohibitive.

Another disadvantage and problem using WORDPRESS and other opensource environments for deployed websites is the lack of security. Because the environment is opensource and is thus used on millions of websites, it is prone to hacking, as substantiated by stories of the vulnerabilities of WORDPRESS exploited by hackers. These vulnerabilities typically arise from plugins or installations that are not kept updated. Some solutions to such problems exist using additional plugins such as WORDFENCE. Also, keeping a CMS installation and plugins up-to-date, forcing strong password, etc. alleviates some of the vulnerabilities, but again more resources are required to fight against the potential attacks. Furthermore, maintaining one CMS installation might not be too much work, but these solutions do not scale well. In the case of hundreds or thousands of websites, keeping all WORDPRESS installations updated may be both time and cost prohibitive.

DETAILED DESCRIPTION

Embodiments described herein provide enhanced computer- and network-based methods, techniques, and systems for deploying target websites, especially those created using a third party content management system ("CMS") for developing websites such as WORDPRESS. Example embodiments provide a CMS Deployment System ("CDS") or CMS Deployment Application ("CDA"), which enables users to create content locally using all of the resources of the CMS and then manage and deploy the target website using a versioning process and in a more secure form on a target server.

In example embodiments, the CDS/CA instantiates each instance of the CMS locally and isolates each from other CMS instances that may be running on the same computing system. Users can add and manage content in a CMS instance in the same way that they would normally interact with the CMS. Then, when the target website is complete, an authorized user (e.g., one with administrative privileges) can export the website to a secure form which can then be deployed on a target server. Use of the CDS/CDA reduces the attack vector for a target website by deploying the target website as flat HTML files instead of incorporating the entire or even a portion of the CMS environment and its resources typically necessary to run a CMS created website. For instance, in an example CDS/CDA, an export facility creates the target website flat HTML files and a deployment facility then transfers the target website to a remote server by, for example, retargeting references (e.g., links) where needed and copying files to the remote server. The CDS/CDA export facility operates typically by "scraping" the CMS website to determine all of the html needed to display the pages of the website and then, in an automated fashion, loads missing resources, renames paths as necessary, etc. In addition, an example CDS/CDA offers a streamlined user interface that allows its users to export a website created using a CMS tool in a single user interface action and then to deploy the target website in a single user interface action. This allows a website to be "upgraded" with revised content "automatically," responsive to a single user action, once the content has been created/modified.

Figure 1:
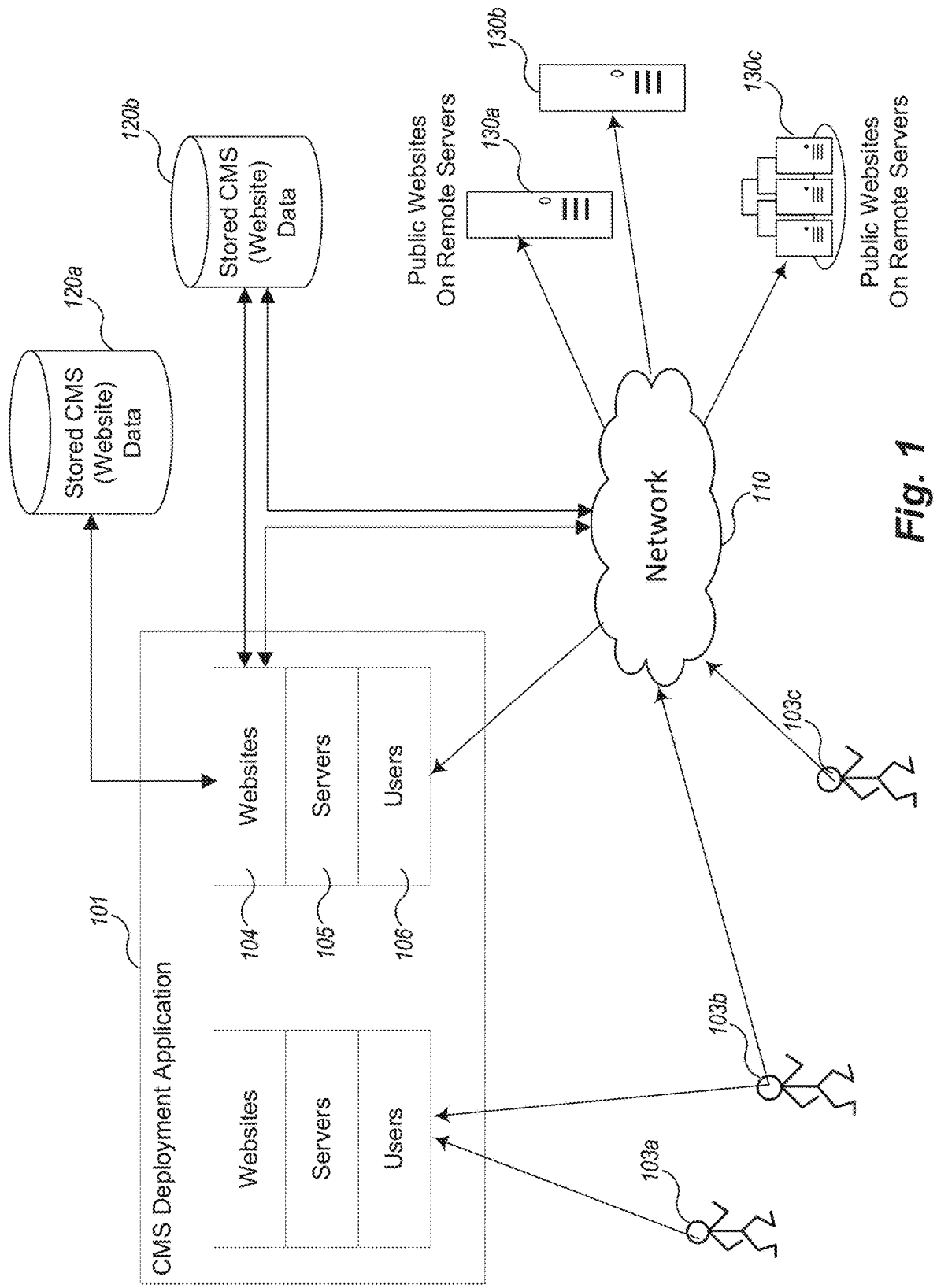
FIG. 1 is a block diagram of an example CMS Deployment Application environment using the techniques, methods, and systems described herein.

FIG. 1 is a block diagram of an example CMS Deployment Application environment using the techniques, methods, and systems described herein. A CMS Deployment System "CDS") provides an instance of a CMS Deployment Application ("CDA") 101 that runs locally on a computer system (e.g., a local server). The CDA 101 is responsible for creating one or more content management system ("CMS") environments for creating one or more target websites (not shown) which can eventually be run as public websites on remote servers/computing systems 130a-130c, accessible by one or more users 103a-103c using a communications network 110, such as the Internet. The CDA 101 manages one or more CMS environments, including allowing users 103a-103c to configure one or more websites 104 (each using a CMS instance), target servers 105, and/or user access permissions capabilities 106. The CDA 101 also communicates with data repositories 120a-120b to store the CMS (website) content for each CMS created website, including resources and other data, and communicates with the remote servers 130a-130c to effectuate the export and deployment of the target websites created. Using the configured user access information 106, different users with potentially different permissions may serve as administrators, editors or content, designers and the like. Each CMS environment for each website configured as websites 104 is a self-contained processing environment such that changes to or content in one website cannot interfere with changes or content in another. Once a website's content is complete, the CDA 101 can export the target website (locally) to one or more flat HTML files (potentially stored in data repositories 120a-120b or in a separate repository), and then deploy the target website via network 110 to one of the remote servers 130a-130c.

Figure 2:
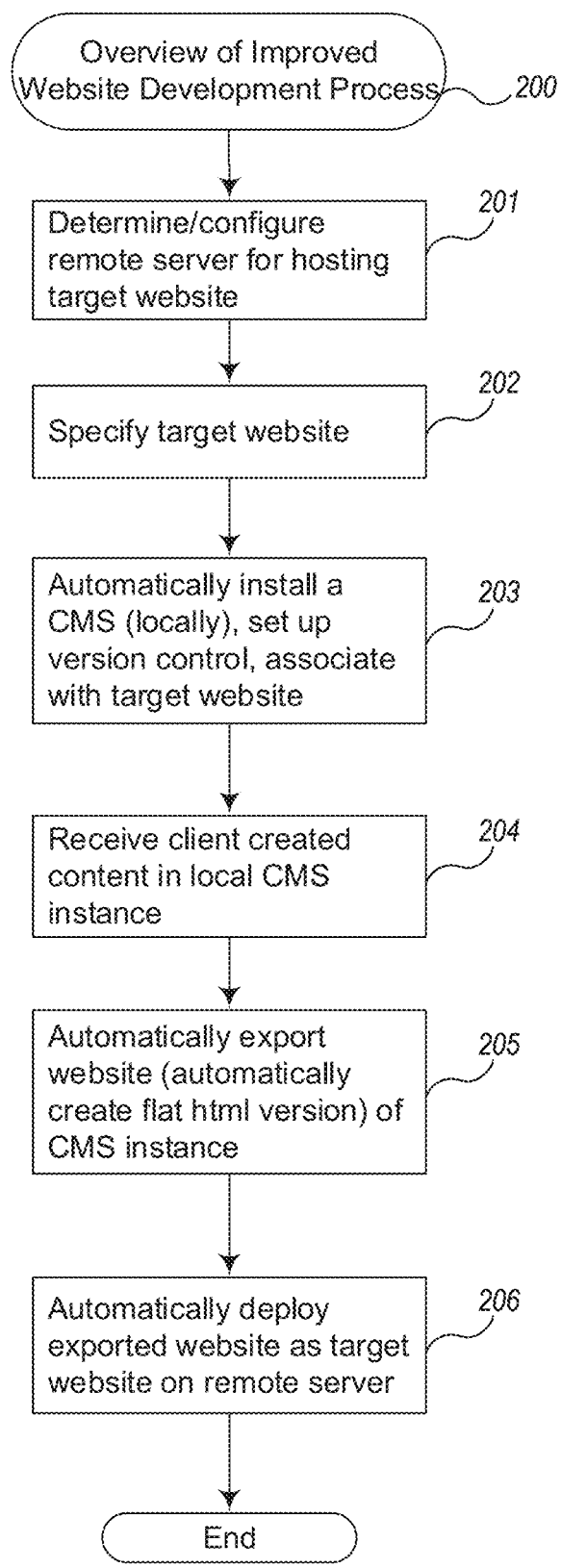
FIG. 2 is an example flow diagram of an overview of an improved website development and update process for creating and deploying a target website using the example CMS Deployment Application environment.

FIG. 2 is an example flow diagram of an overview of an improved website development and update process for creating and deploying a target website using the example CMS Deployment Application environment. The improved website development process 200 may be provided by one or more components, modules, or facilities within an example CDA instance. In overview, in block 201, the CDA determines or configures at least one remote server for hosting a target website. For example, this configured server may be one of configured target servers 105 in FIG. 1. In block 202, the CDA receives an indication of a target website from a user (typically a user with administrative privileges). For example, the target website may be one of configured websites 104 in FIG. 1. In block 203, the CDA automatically installs an instance of the CMS that is being used (specified, or by default), sets up version control for the target website, and associates the target website with a target server. Once the CMS instance setup for the target website is complete, then in block 204, content is received from one or more users using a standard CMS interface (for example, in WORDPRESS, a user creates posts, uses templates, and the like). Example CDA 101 may support more than one type of CMS and since each operates within its own environment, the CDA is extensible. (For example, there may be two different or the same CMS instances executing as part of CDA 101.) Sometime later, in block 205 after the target website content is deemed sufficiently complete to release (e.g., a user typically decides that the site is ready to "release" publicly), a user (typically one with administrative privileges) can automatically export the website to create the target 'format' for the website—flat HTML files. In an example environment, the CDA automatically exports the website at the touch of a single user interface control, e.g., a button, by processing the website to generate the html files without further user commands. However, in some example CDAs, the user may be asked to verify or correct particular information. Then, in block 206, the CDA exports the website to its target location on the associated remote server. In some example CDAs, a user is given opportunities to confirm the contents of the target website before it is exposed (deployed over a public communications network).

The CDA works automatically in the sense that once given the appropriate indication to either export or deploy, the CDA takes care of transforming the CMS content into a form directly executable (the flat HTML files) on the remote server. In example CDAs, this transformation is accomplished using tools that scrape content and correct the content to load and/or reference missing information or resources. Any such corrections to make the content executable properly are also handled by the CDA. Thus, little if any user expertise is required to deploy the target website after the content is created, updated, or modified using a content management system.

Figure 3A:
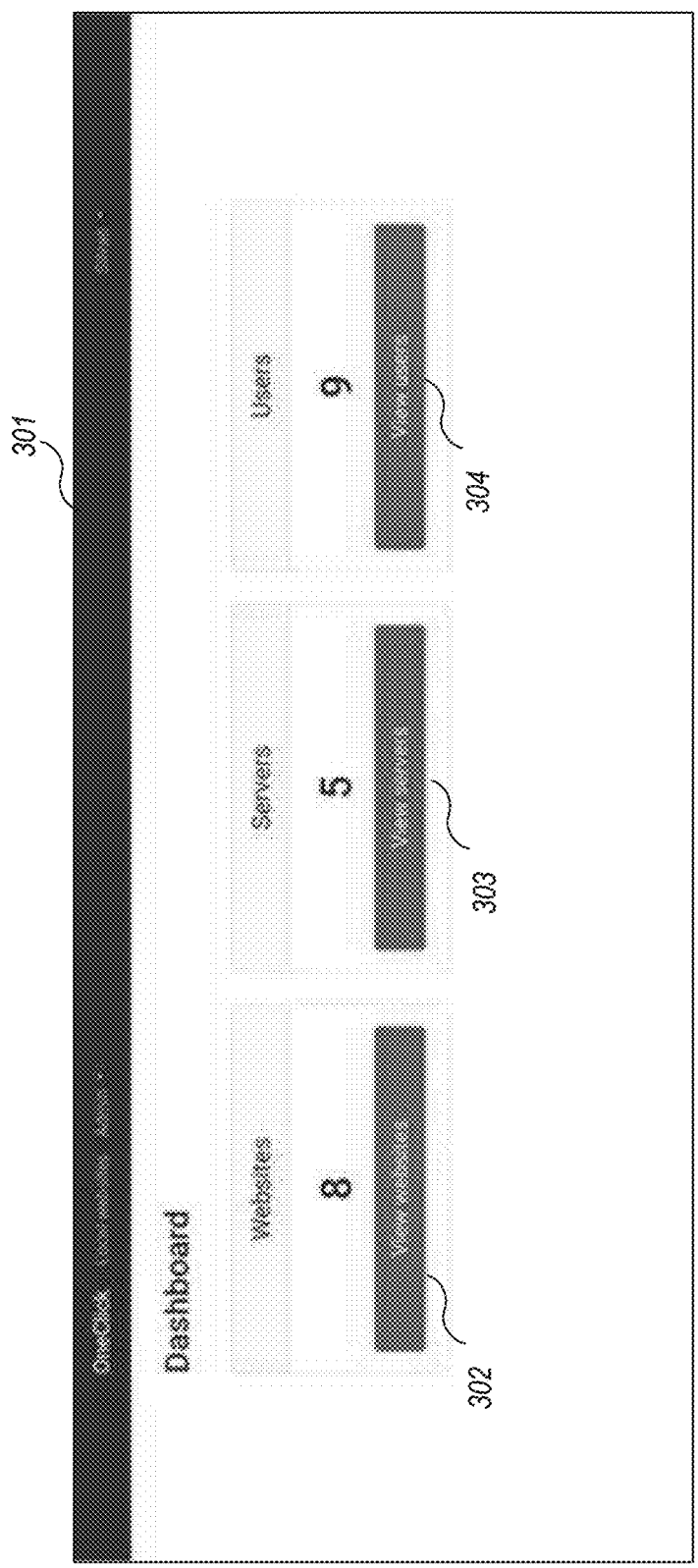
FIGS. 3A-3U are example screen displays from an example user interface that performs website development and deployment according to an example CMS Deployment Application environment described herein.
Figure 3B:
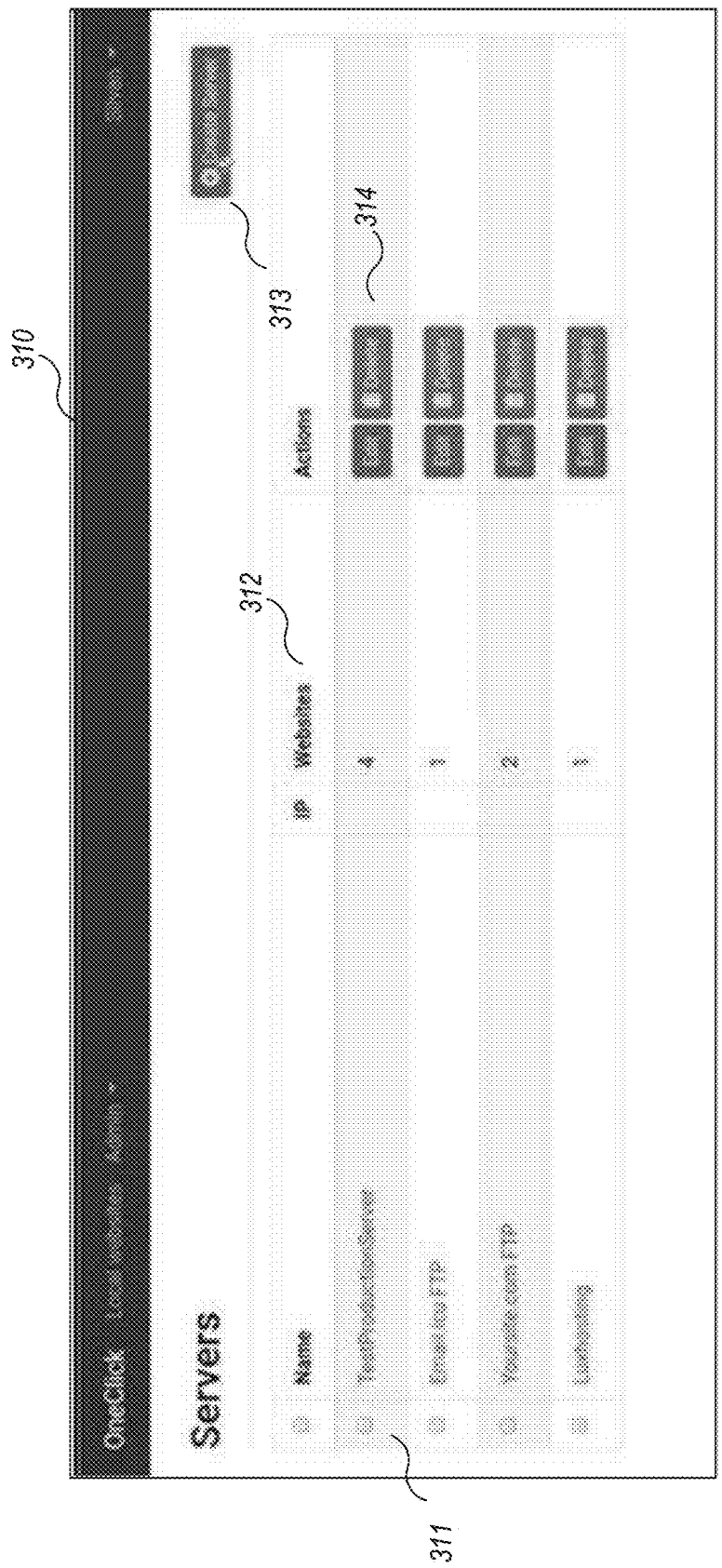
Figure 3C:
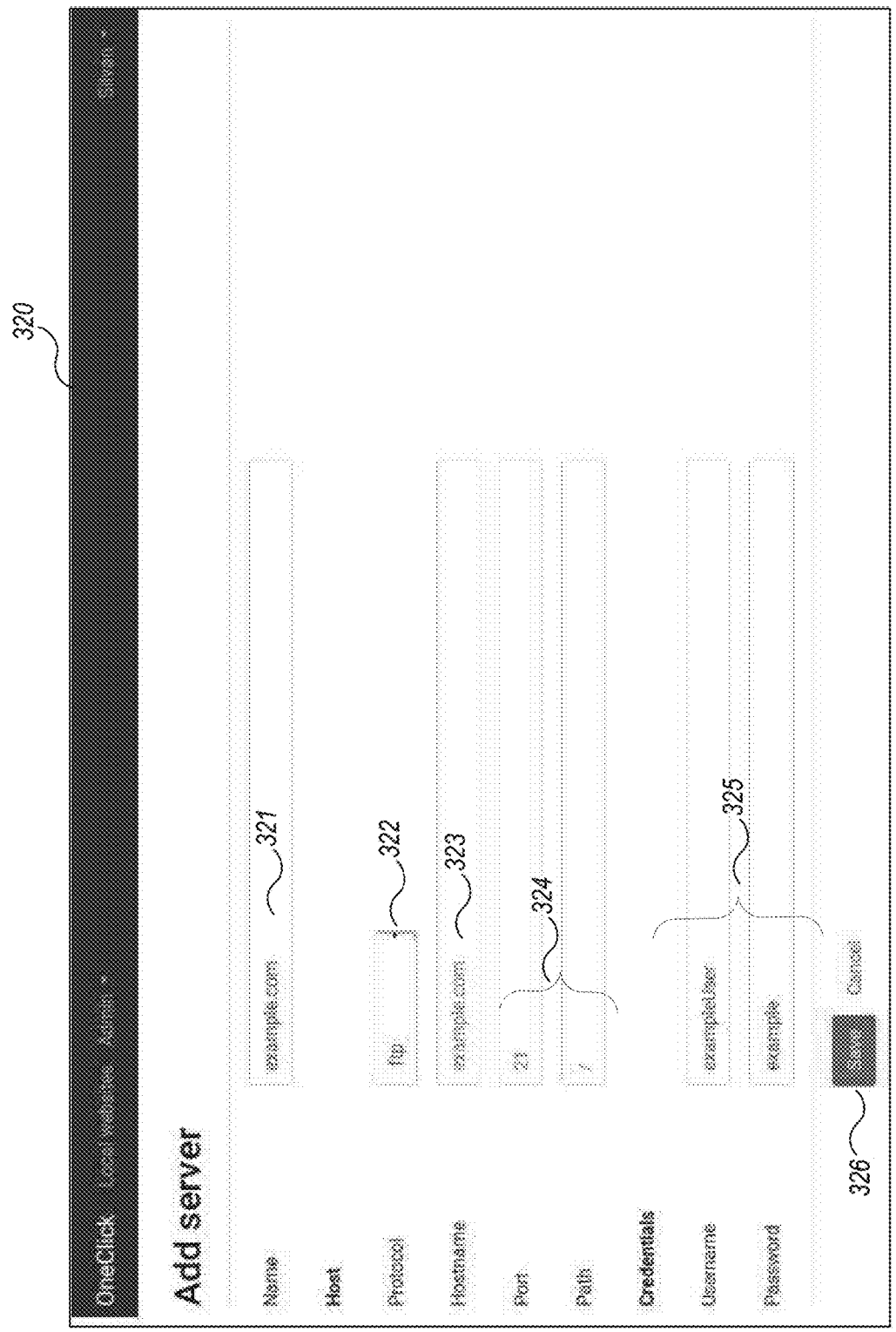
Figure 3D:
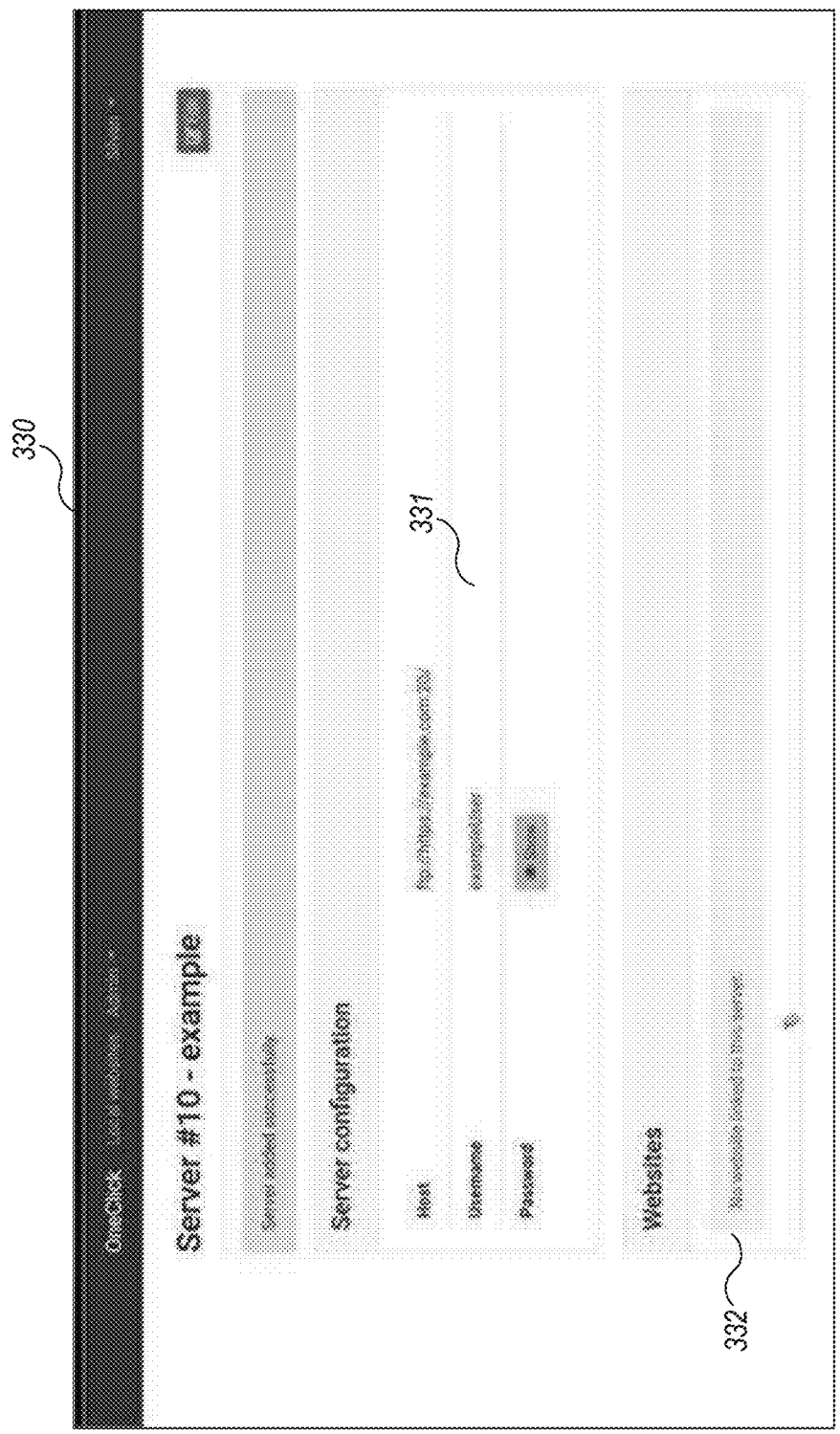
Figure 3E:
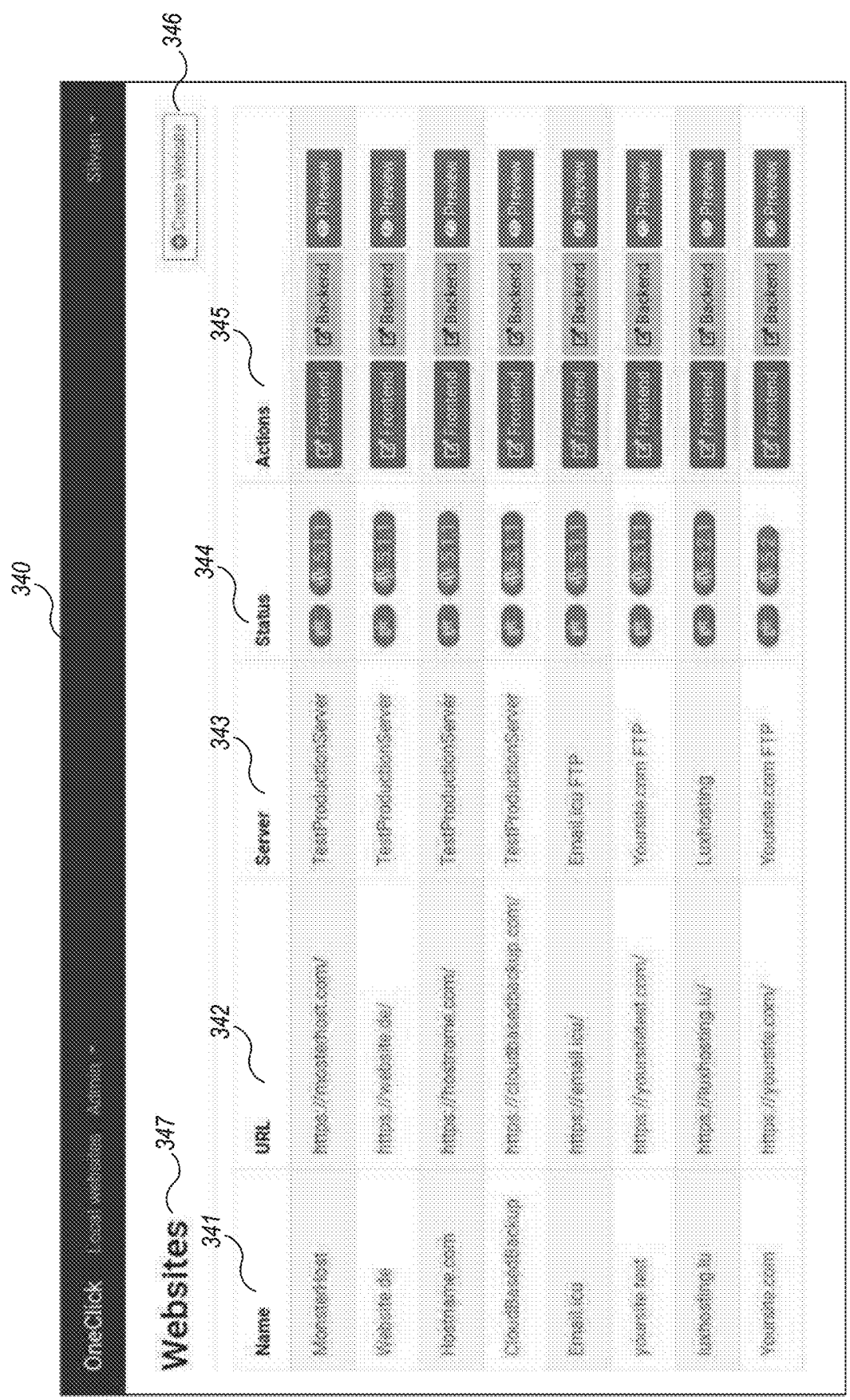
Figure 3F:
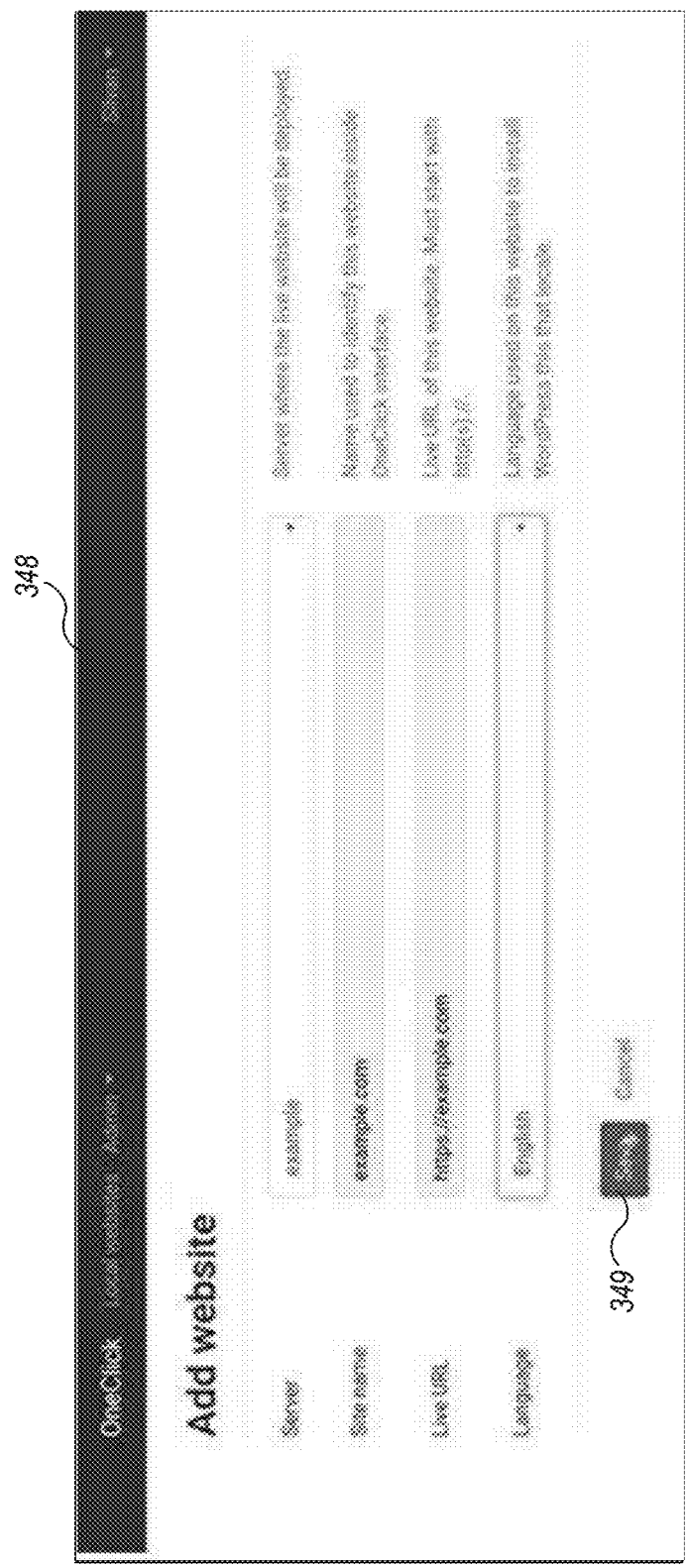
Figure 3G:
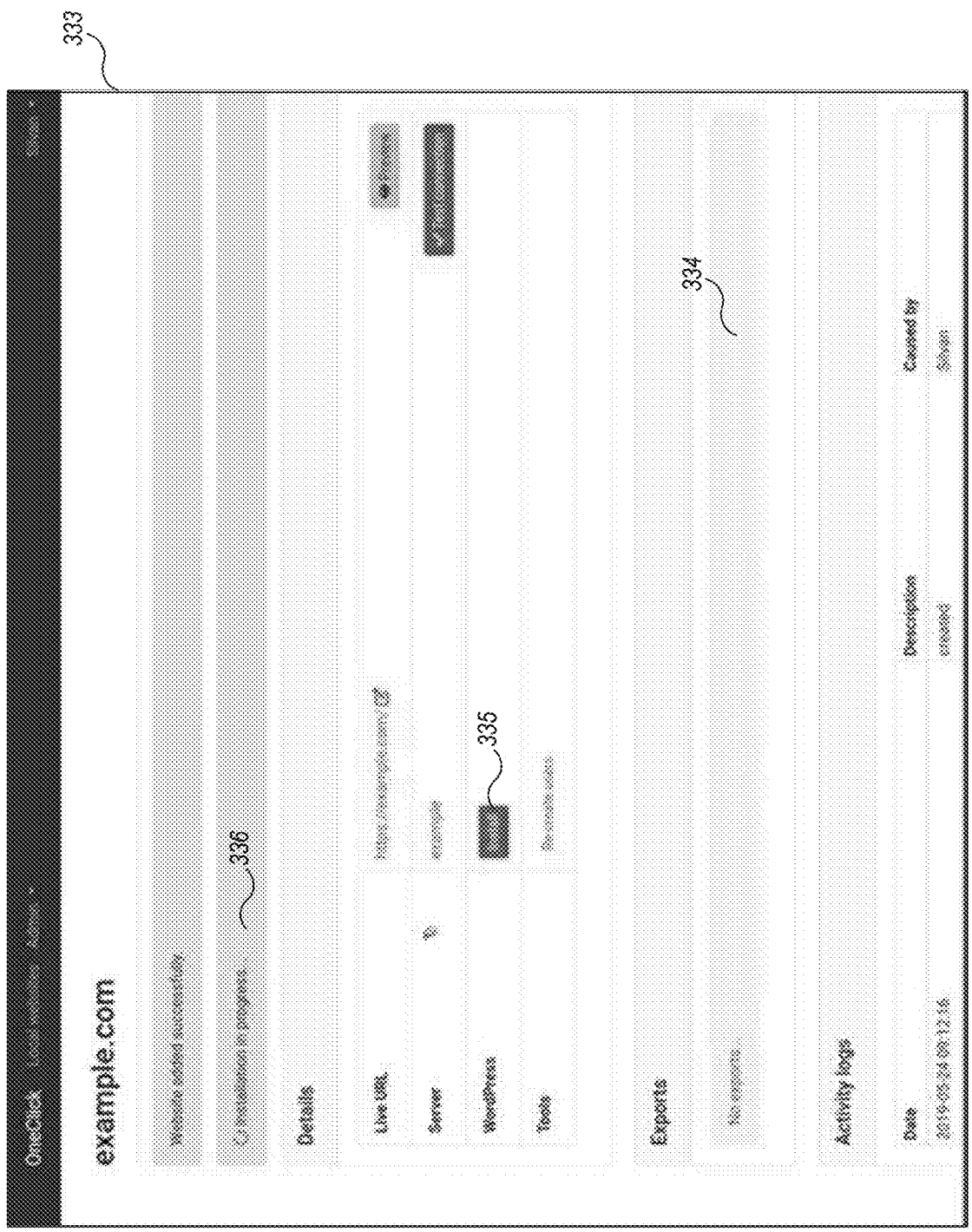
Figure 3H:
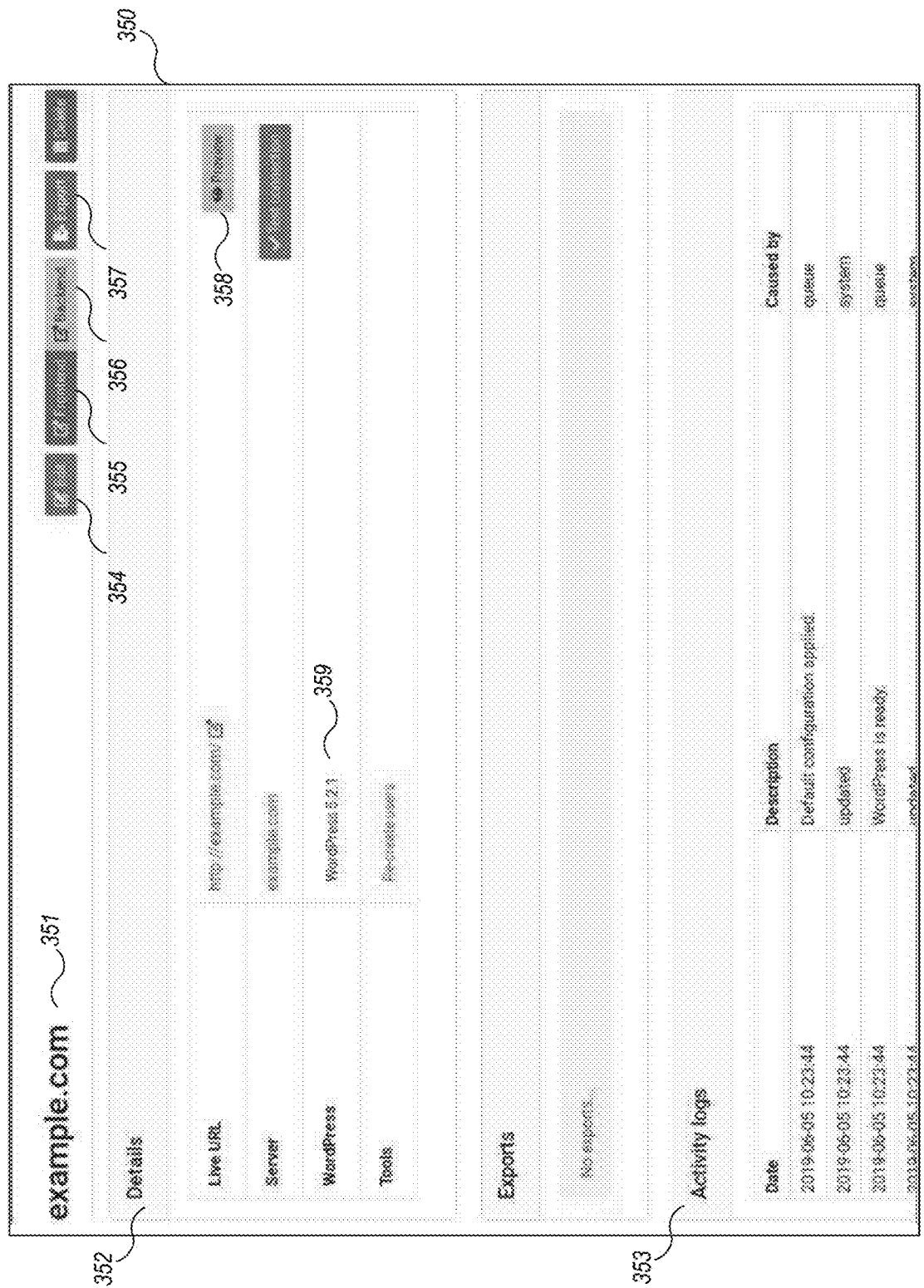
Figure 3I:
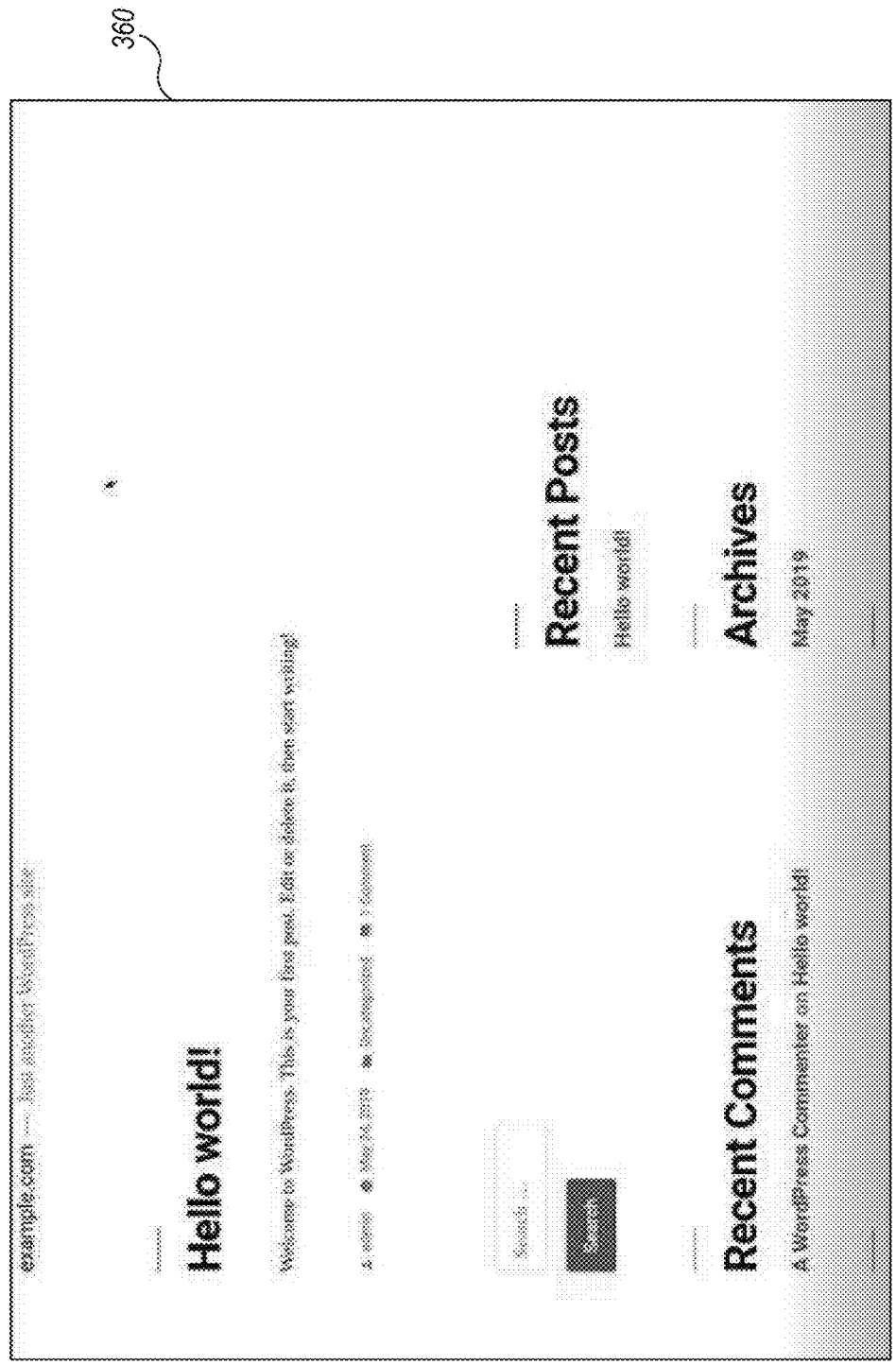
Figure 3J:
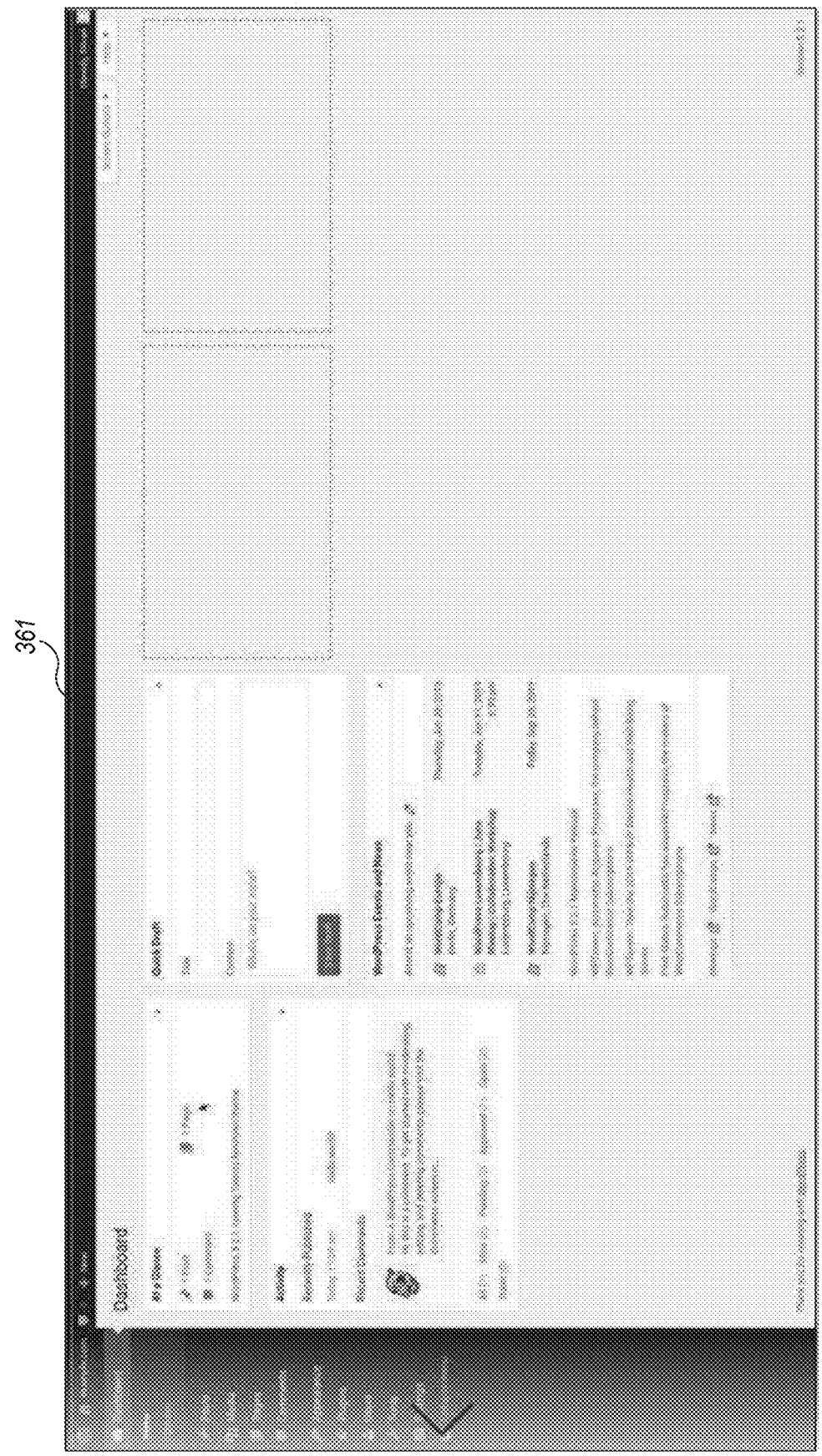
Figure 3K:
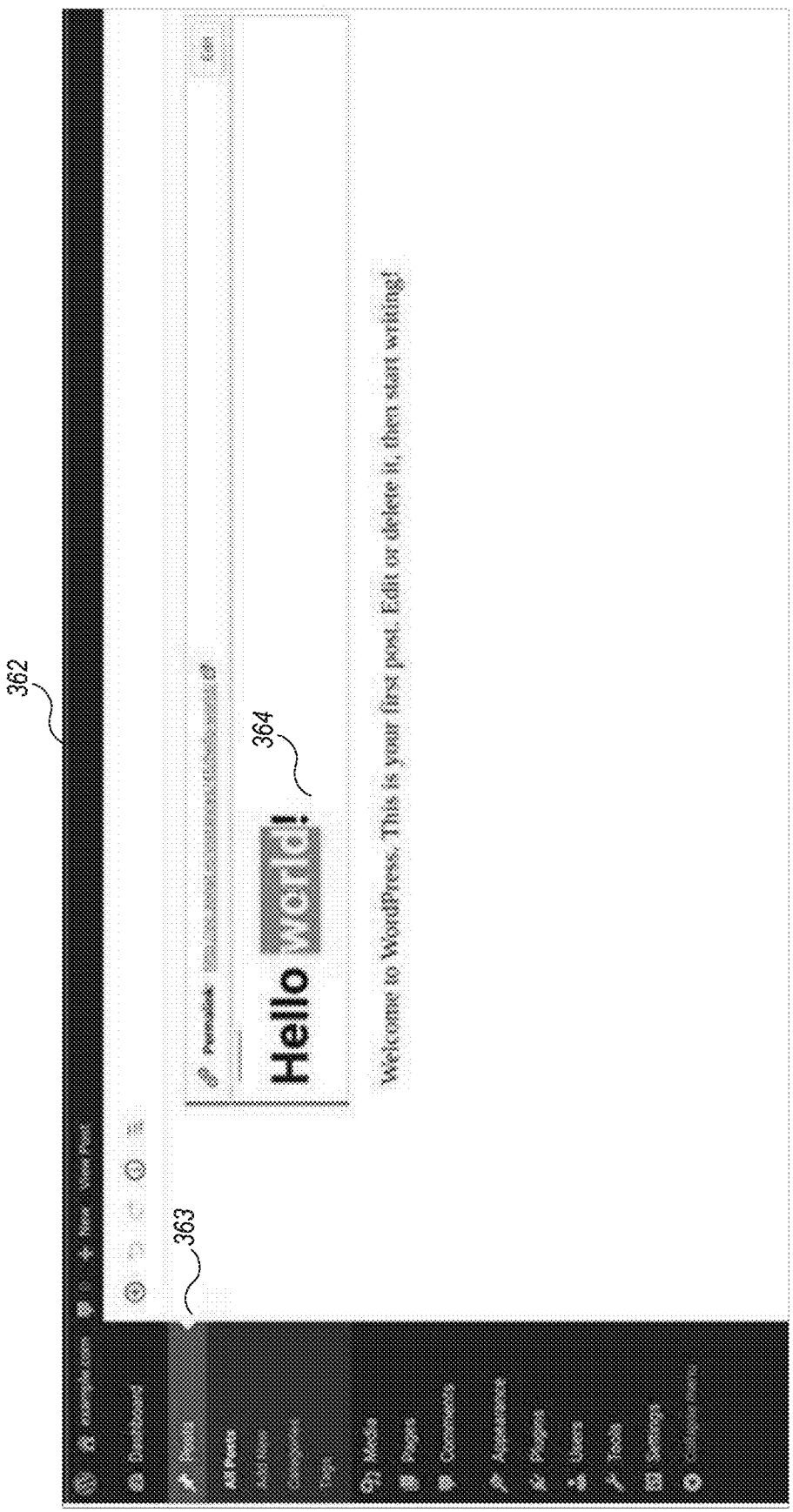
Figure 3L:
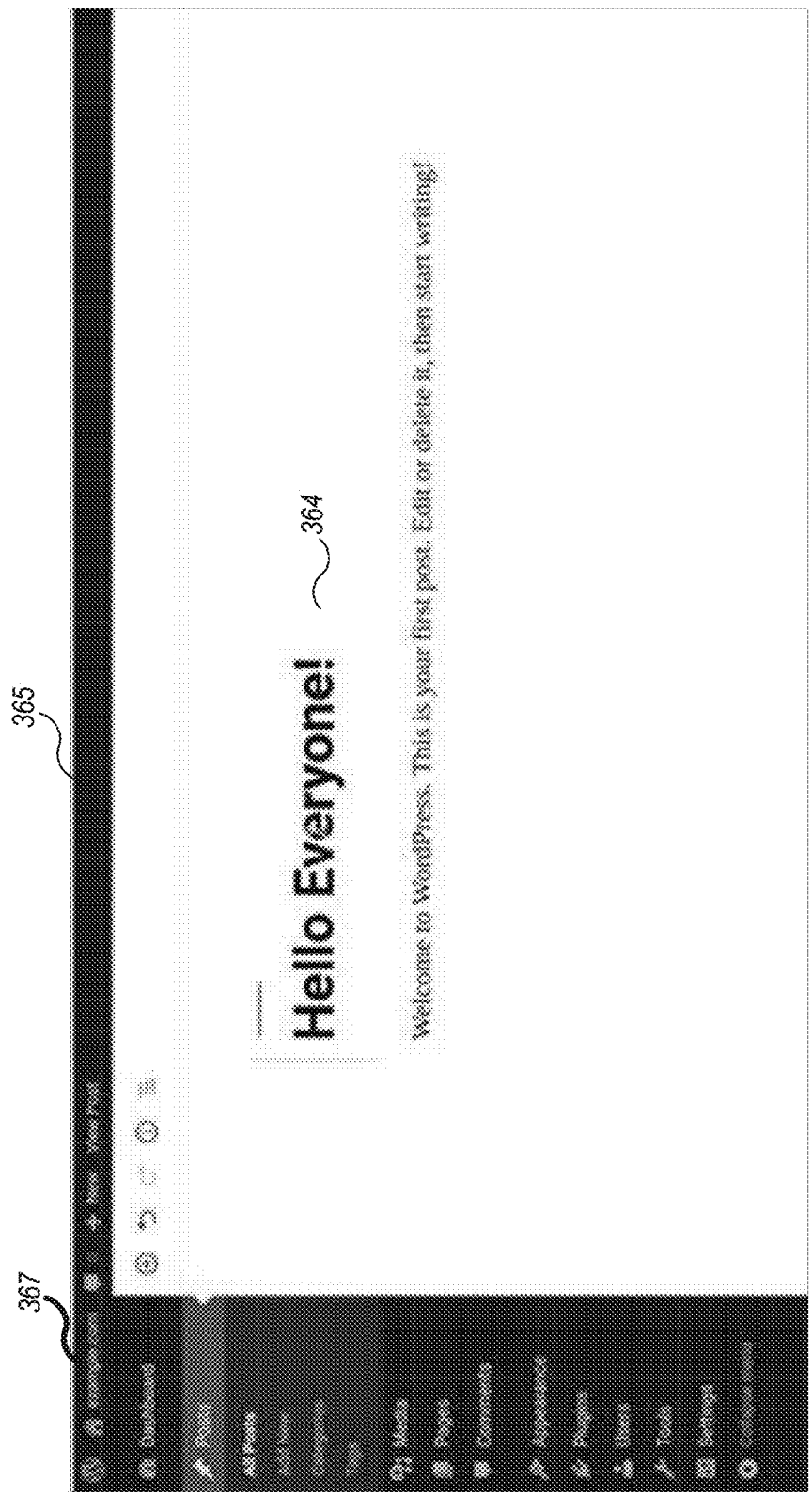
Figure 3M:
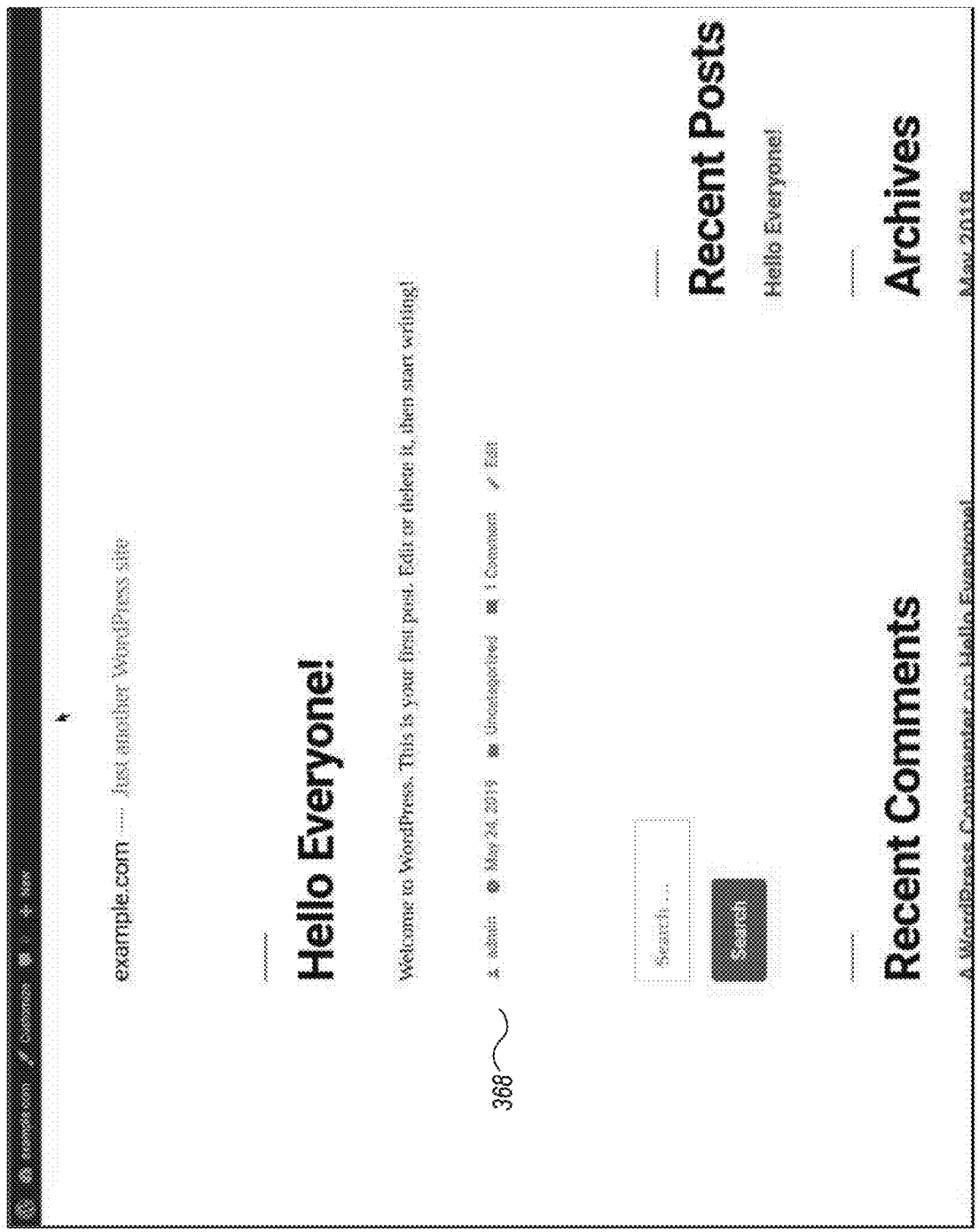
Figure 3N:
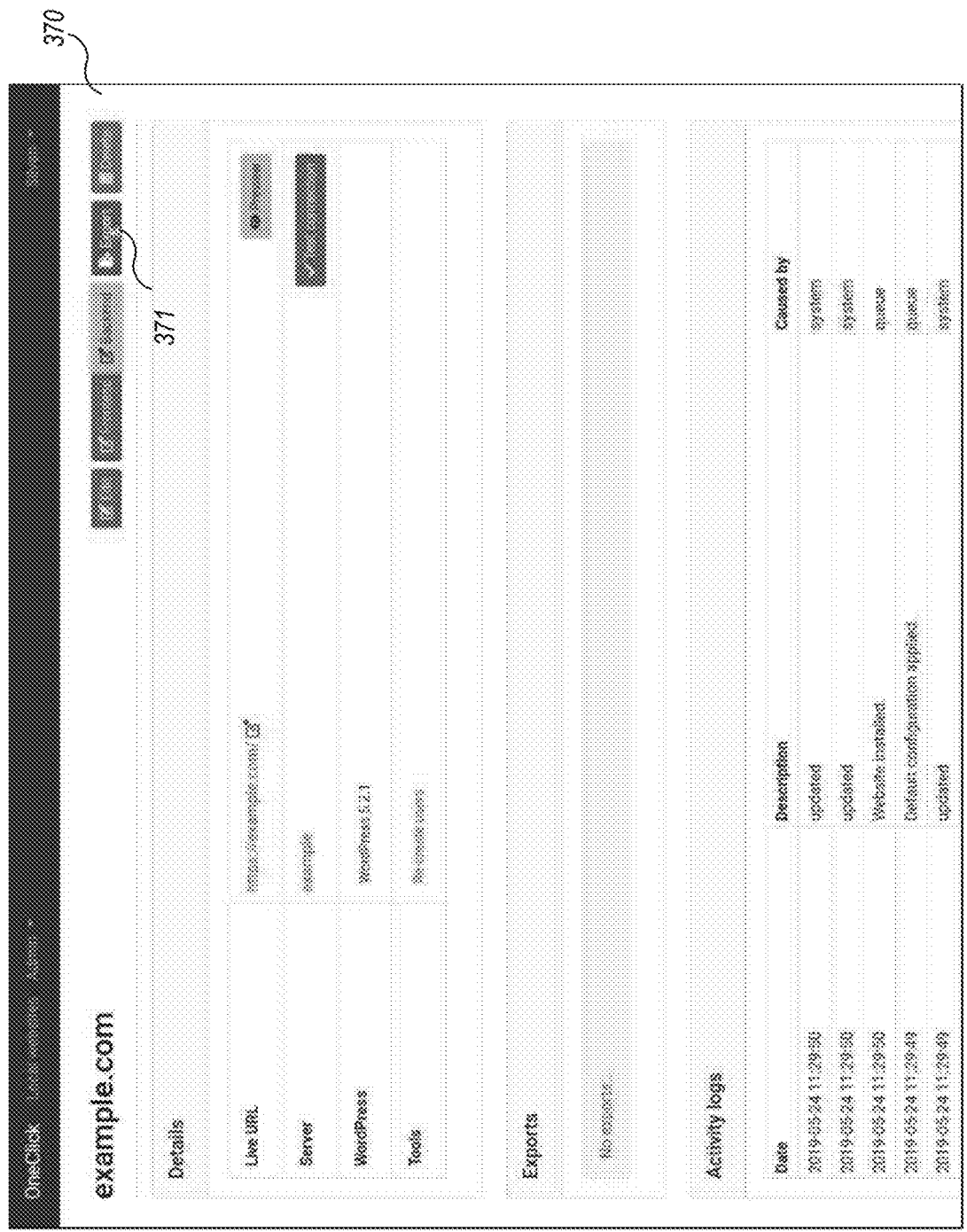
Figure 30:
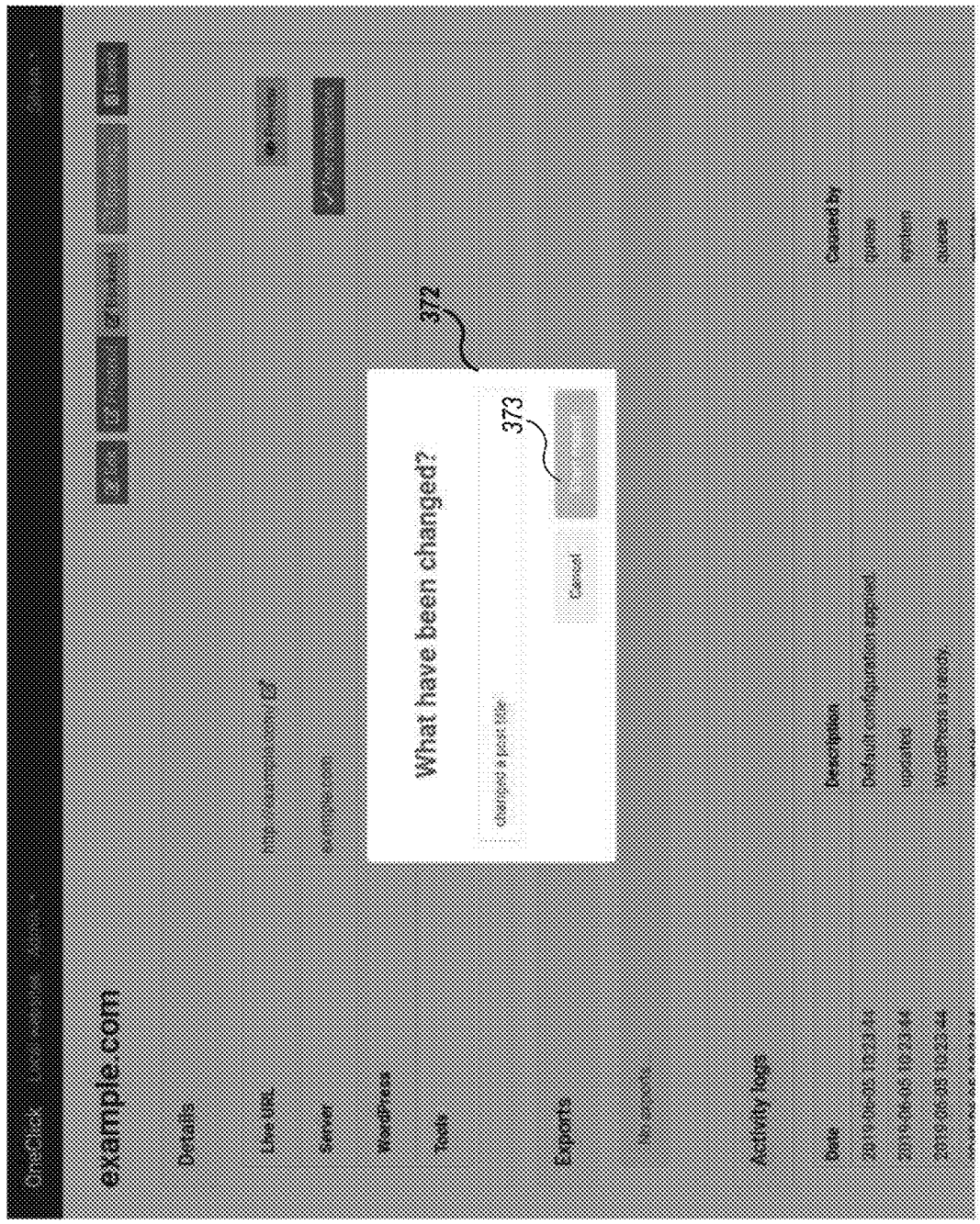
Figure 3P:
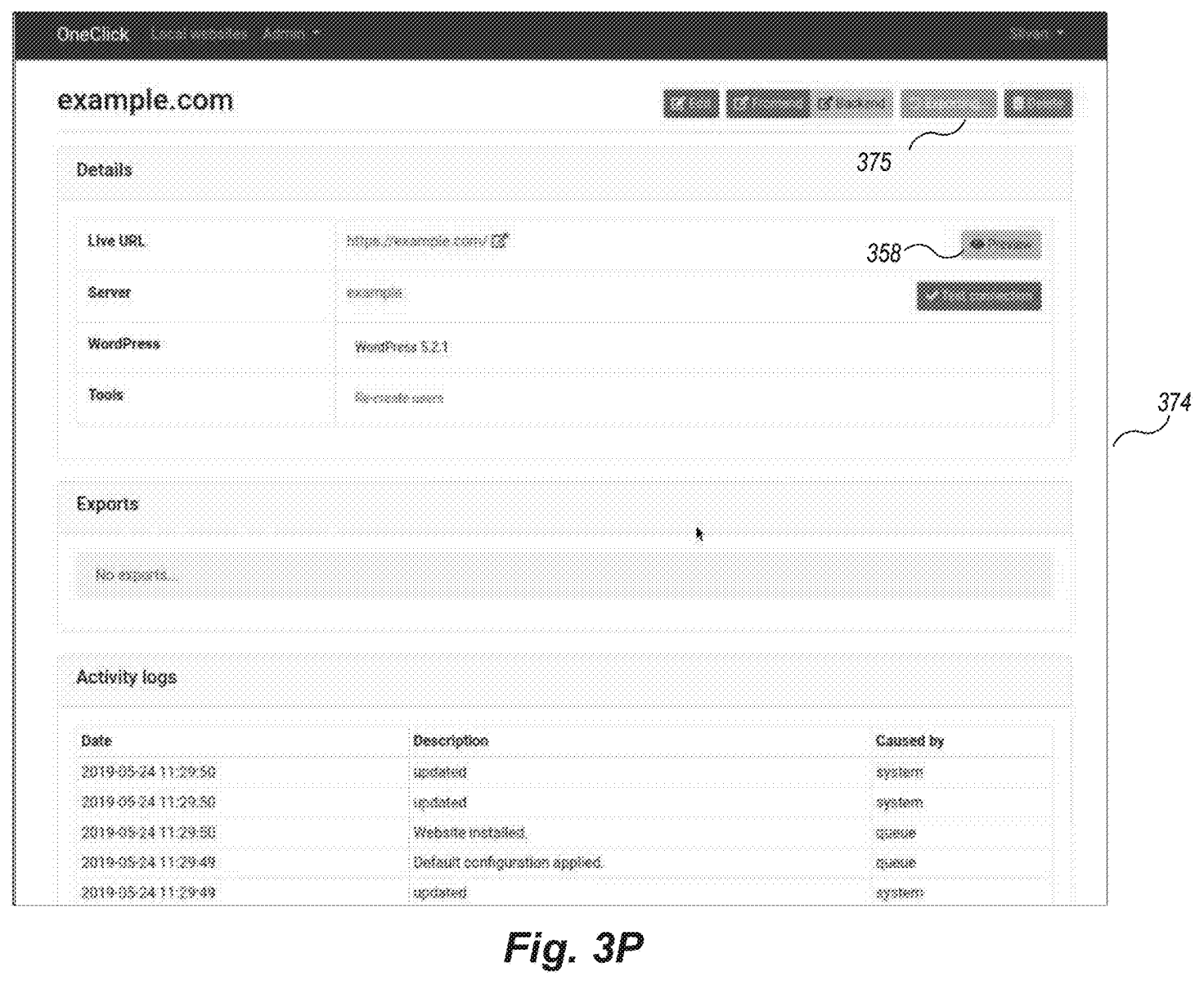
Figure 3Q:
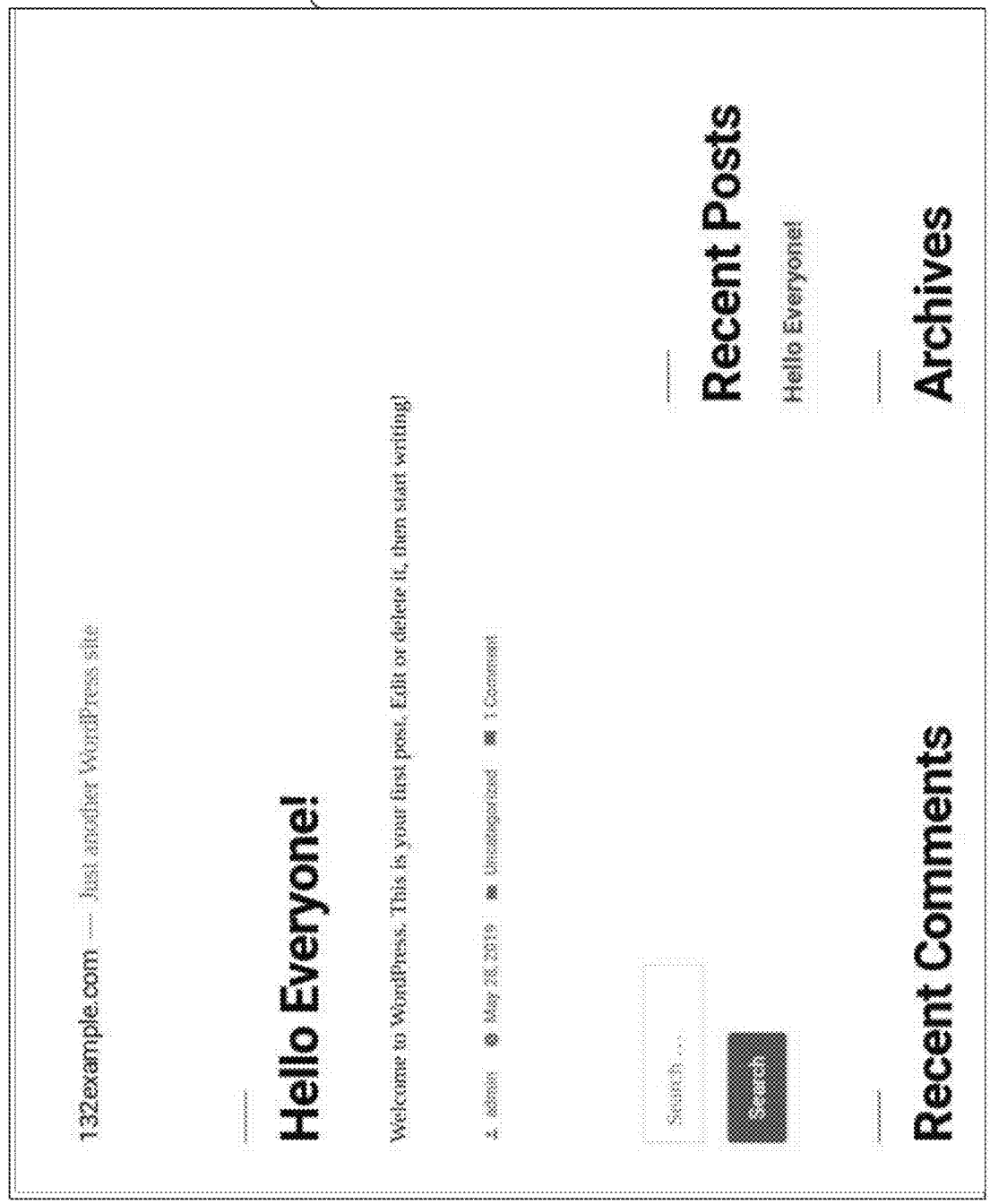
Figure 3R:
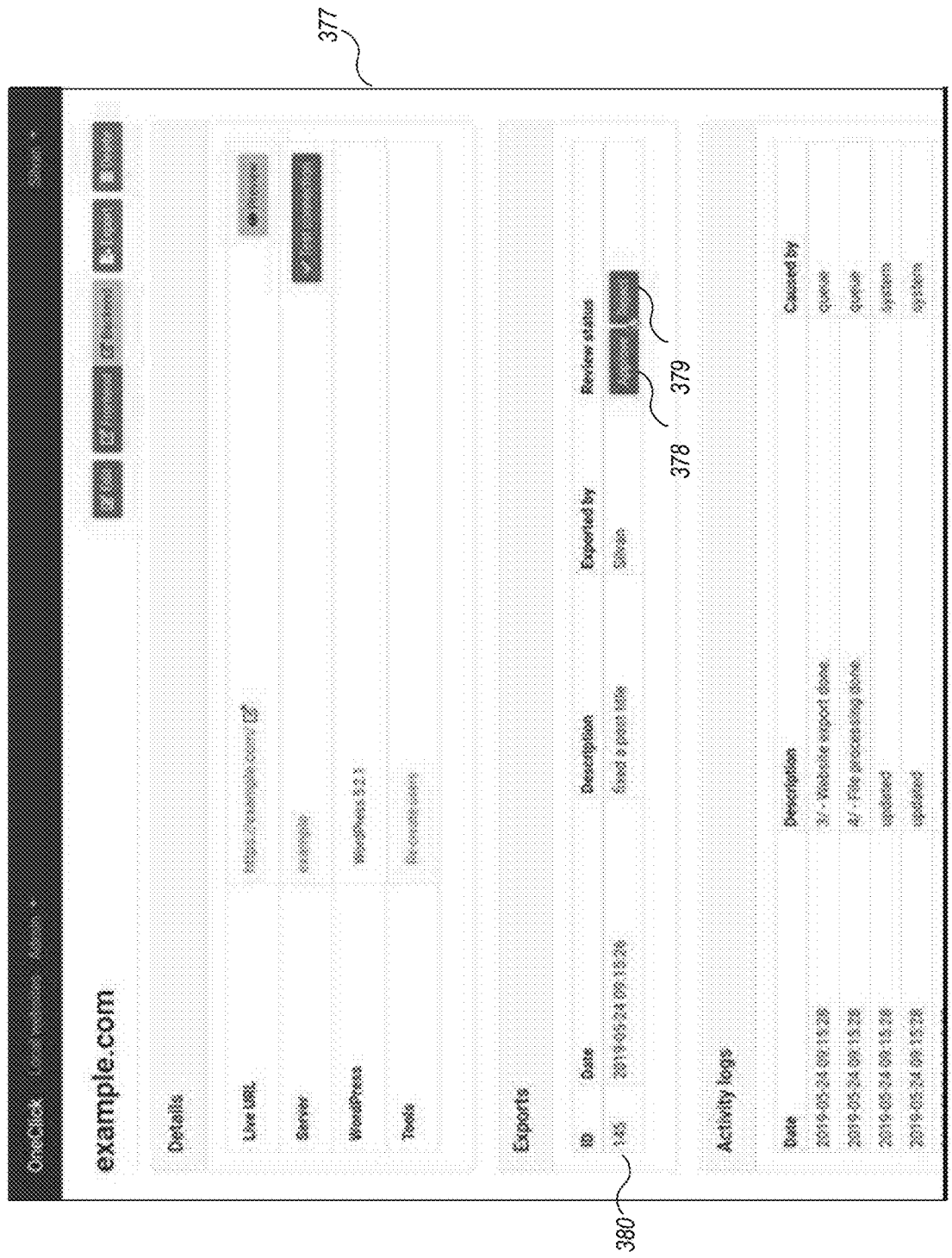

FIGS. 3A-3R are example screen displays from an example user interface that performs website development and deployment according to an example CMS Deployment Application environment described herein. These display screens were captured from an example embodiment of a CDA called "OneClick." Other screen displays for this CDA or another example CDA may have equivalent features or may be implemented using different technologies or in different arrangements from those described herein to still achieve similar or equivalent function.

FIG. 3A is an example of the dashboard screen display 301 that is presented by the CDA when it begins. Dashboard screen display 301 includes a list of websites with a user interface ("UI") control (or UI element) 302 to configure (e.g., view, edit, or specify) them; a list of servers with a UI control 303 to configure them; and a list of users that can be configured via UI control 304. Upon selection of UI control 303 in FIG. 3A, the screen display 310 as shown in FIG. 3B presents a list of the servers configured thus far, including the name of each server 311, a indicator of which website 312 is associated with each server (e.g., an IP address), and action UI controls, including Edit or Delete buttons 314 for each server. A user can configure a new server for the CDA using the "Create Server" UI control 313.

Once the Create Server UI control 313 is selected, as shown in FIG. 3C, the screen display 320 displays information for the corresponding server in a set of user interface controls (e.g., text edit fields) that can be edited. For example, a user can edit the name of the server 321, indicate the protocol available for transfer of files 322 (e.g., "ftp"), the hostname for the target website 323, the port and path 324 for the server, and credentials for server access 325.

Upon selection of a "Save" UI control 326, the CDA displays the information for the newly configured server, for example, the display screen 330 as shown in FIG. 3D. In display 330, the CDA presents the hostname access path (reflecting the protocol, domain, port etc.), along with the access username and password as shown in fields 331. Example notification 332 indicates that no target websites have been linked yet to the newly created (configured) server.

In FIG. 3A, the user can also configure websites using dashboard screen display 301 by selection of "Websites" UI control 302. The user can also configure user permissions as shown in dashboard screen display 301 of FIG. 3A by selection of UI control 304.

After selection of the Websites UI control 302, as illustrated in FIG. 3E, the screen display 340 then presents a list of the websites 347 configured thus far, including the name of each website 341, the URL 342 associated with that website, an indication of which configured server 343 is associated with that website, an indicator of its version status 344, and a set of action UI controls 345, including access to the frontend (UI) of the CMS instance for that website, access to the backend (UI) of the CMS instance for that website, and a preview of the website using the CMS instance. A user configures and initializes creation of a new website using the "Create Website" UI control 346.

Once the Create Website UI control 346 is selected, as shown in FIG. 3F, the screen display 348 displays information for the corresponding website in a set of user interface controls (e.g., text edit fields) that can be edited in much the same way the server information can be edited. For example, a user can edit the name used to identify the website to the CDA instance, the live URL (or uniform resource identifier URI) of the website (on the local server), and the language used to install the CMS where applicable.

Upon selection of a "Save" UI control 346 in FIG. 3F, as illustrated in FIG. 3G, the CDA displays the information for the newly configured website, for example, the display screen 347. The user can also install a corresponding instance of the CMS using "Install" UI control 335 so that creation and editing of website content and CMS configuration can proceed. As shown by notification 334, the website at this point has no exported versions available, because it has not yet been exported (to flat HTML files) and thus not yet deployed to an associated server. In addition, notification field 336 indicates that the installation is in progress. An example installation process is described below with reference to FIGS. 6 and 7.

FIG. 3H shows the CDA display screen 350 after the CMS install is completed. Once installation is complete, the details 352 of the website of website name 351 are illustrated, as well as an indication of the current version of the CMS installed 359 and a list of activities 353 conducted with respect to the target website. Since the CMS instance installation is now complete, UI controls for access to the CMS, including "Frontend" UI control 355 and "Backend" control 356, are made available to navigate the user to the standard user interface of the CMS. The CDA also displays "Edit" UI control 354 to edit the website details; an "Export" UI control 357 to begin the export process to production format files (flat HTML), and a "Preview" UI control 358 to display the created website thus far. (Before content is added selection of the Preview UI control 358 may display default and/or template contents.) For example, selection of the Frontend UI control 355 (or the Preview UI control 358 at this point) may display the display screen 360 illustrated in FIG. 3I. Selection of the Backend UI control 356 may display the display screen 361 illustrated in FIG. 3J. This is a standard CMS interface for adding content to the newly configured website, such as to add a new "post."

For example, in FIG. 3K, the CDA displays a display screen 362 for the corresponding CMS instance. Here, the user has selected a UI control 363 to edit or view "posts" within the website named "example.com." Display screen 362 illustrates a standard WORDPRESS interface for editing a post. The display shows that the title of the post "Hello world!" is being edited in edit field 364 to the proposed title "Hello Everyone!" as shown in edit field 364 in display screen 365 in FIG. 3L.

Once edits are completed, the user may select an "Update" UI control (not shown) to save the edits and then select the link field 367 (or equivalent in other CMS environments), to preview the newly created post as will be made available to the public (eventually) and as shown in FIG. 3M. Notifications field 368 demonstrates that this is a standard WORDPRESS post with posting information.

After completing modifications to the point desired, the user (typically one with administrative privileges) can process to export the website and deploy it to the target server. FIG. 3N is an example display screen 370 of the CDA after new content is available for export. Here, the user can select "Export" UI control 371 to begin the export process. In FIG. 3O, the CDA interface prompts the user in dialog control 371 to describe what has changed and to confirm that exporting is desired. The user can select "Start export" UI control 373 to begin the export process. As shown in FIG. 3P, upon selection of UI control 373, the CDA indicates via a "busy icon" in Exporting UI Control 375 that the exporting process is taking place (without requiring further user intervention). Selection of the Preview UI control 358 (see FIG. 3H) results in screen display 376 illustrated in FIG. 3Q. This display is similar to that shown in FIG. 3I; however, note the title change in the post and the updated posting information.

As described earlier, an export facility is responsible for transforming the CMS created website into a format more suitable for deployment, in this case flat HTML files. An example export process is described further below with respect to FIG. 8.

Once the export process has completed, the example CDA provides an opportunity for the user to approve or verify the website changes described by the version notification 380 using "Approve" UI control 378 as shown in display screen 377 of FIG. 3R. Alternatively, the user can reject the changes using "Reject" UI control 379.

Figure 3S:
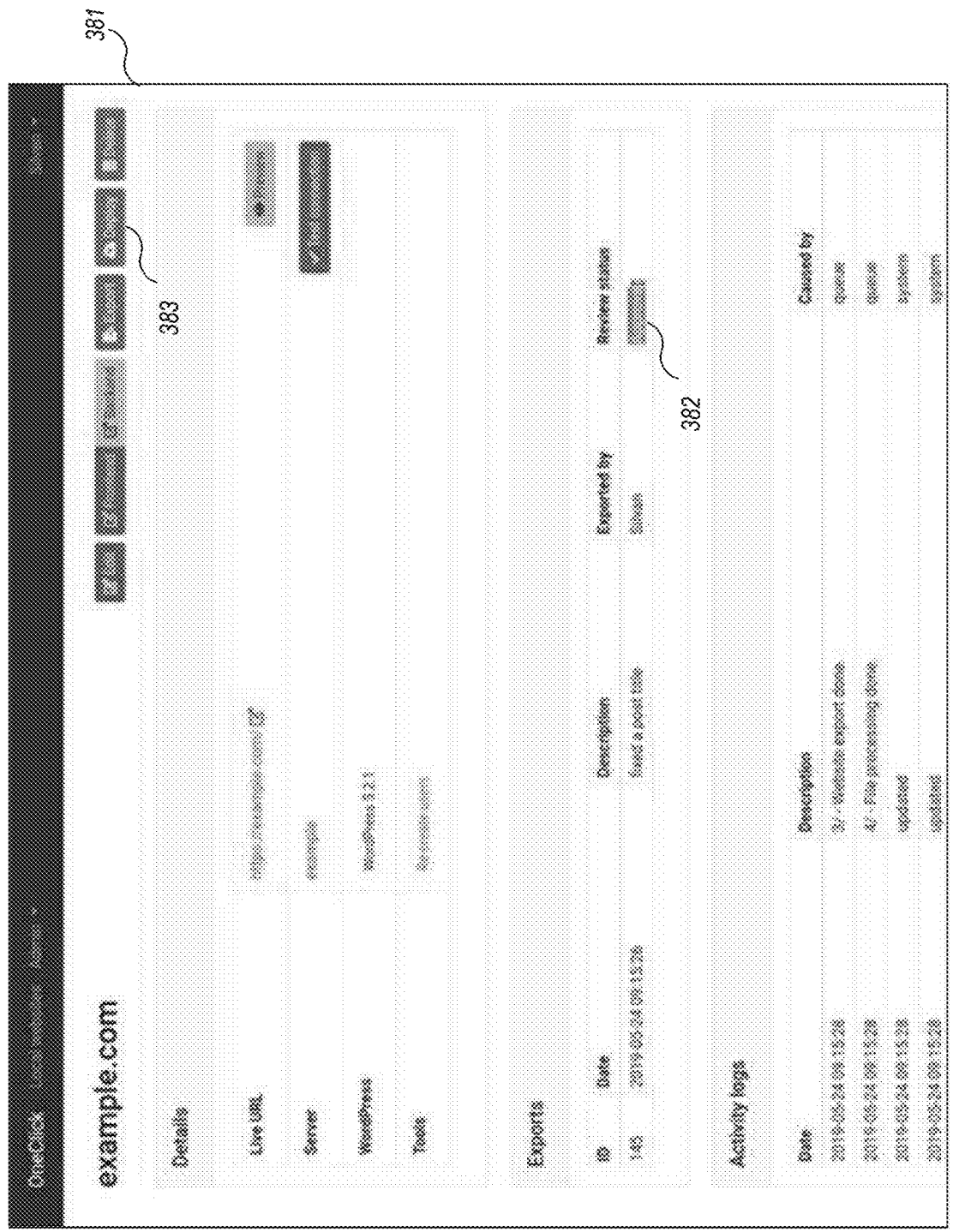
Figure 3T:
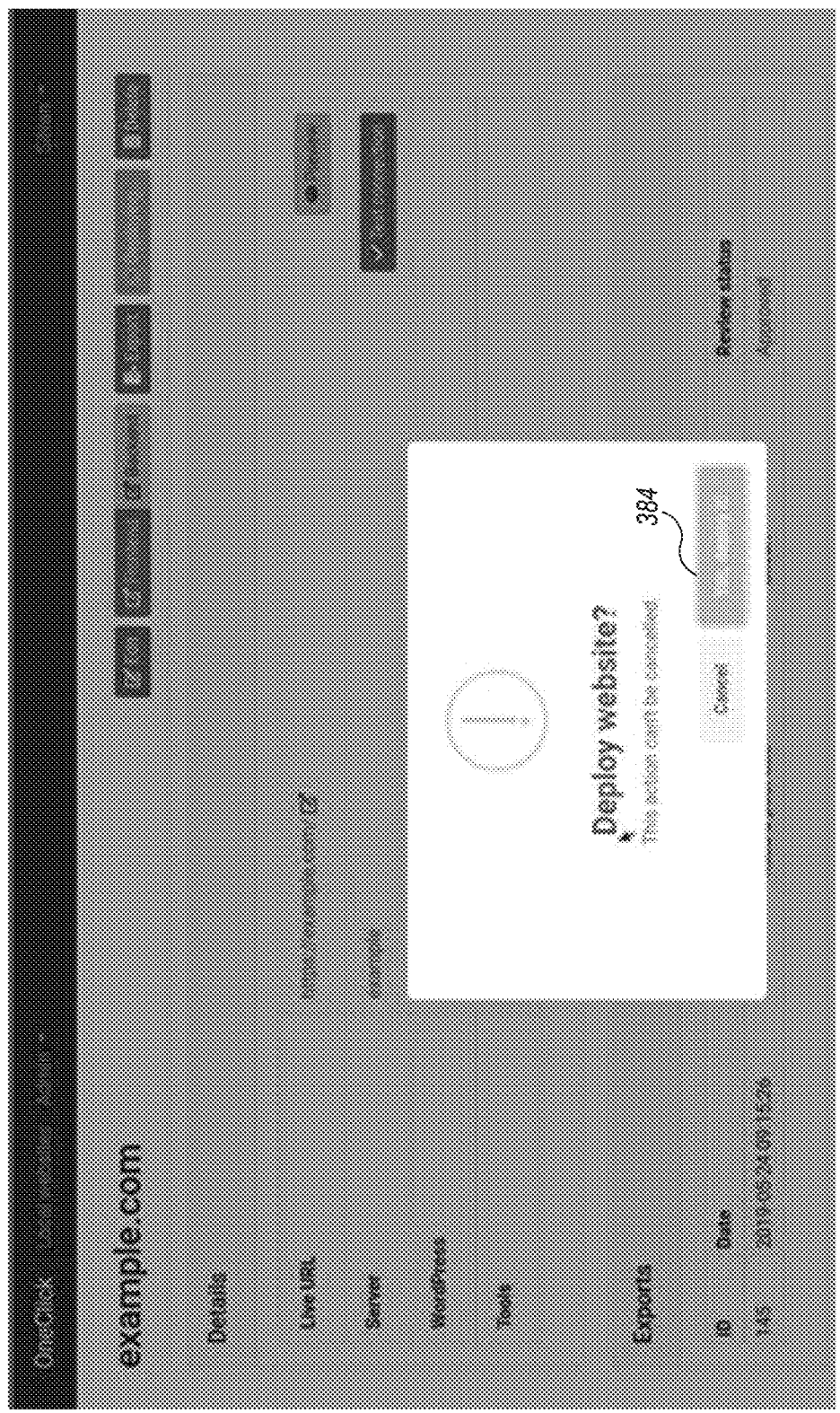

FIG. 3S shows an example CDA display screen 381 after the user has approved the new version changes. The review status indicator 382 shows that the changes were approved. Display screen 381 indicates to the user that the version is ready for deployment by adding the "Deploy" UI control 383 to the display screen 381. Upon selection of the Deploy UI control 383, the CDA displays a confirmation dialog to the user as shown in FIG. 3T. Upon selection of the confirmation UI control 384, the CDA begins the deployment process for deploying production files to the target server for release publicly (e.g., over communications network 110 in FIG. 1).

As described earlier, a deployment facility is responsible for transferring the production formatted website to the target server using the configured protocols, for example, as indicated in FIG. 3C. An example deployment process is described further below with respect to FIG. 9.

Figure 3U:
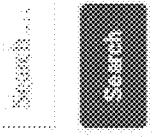

FIG. 3U shows the target website after it has been deployed to the target server and is available publicly, for example, over network 110 in FIG. 1.

Figure 4:
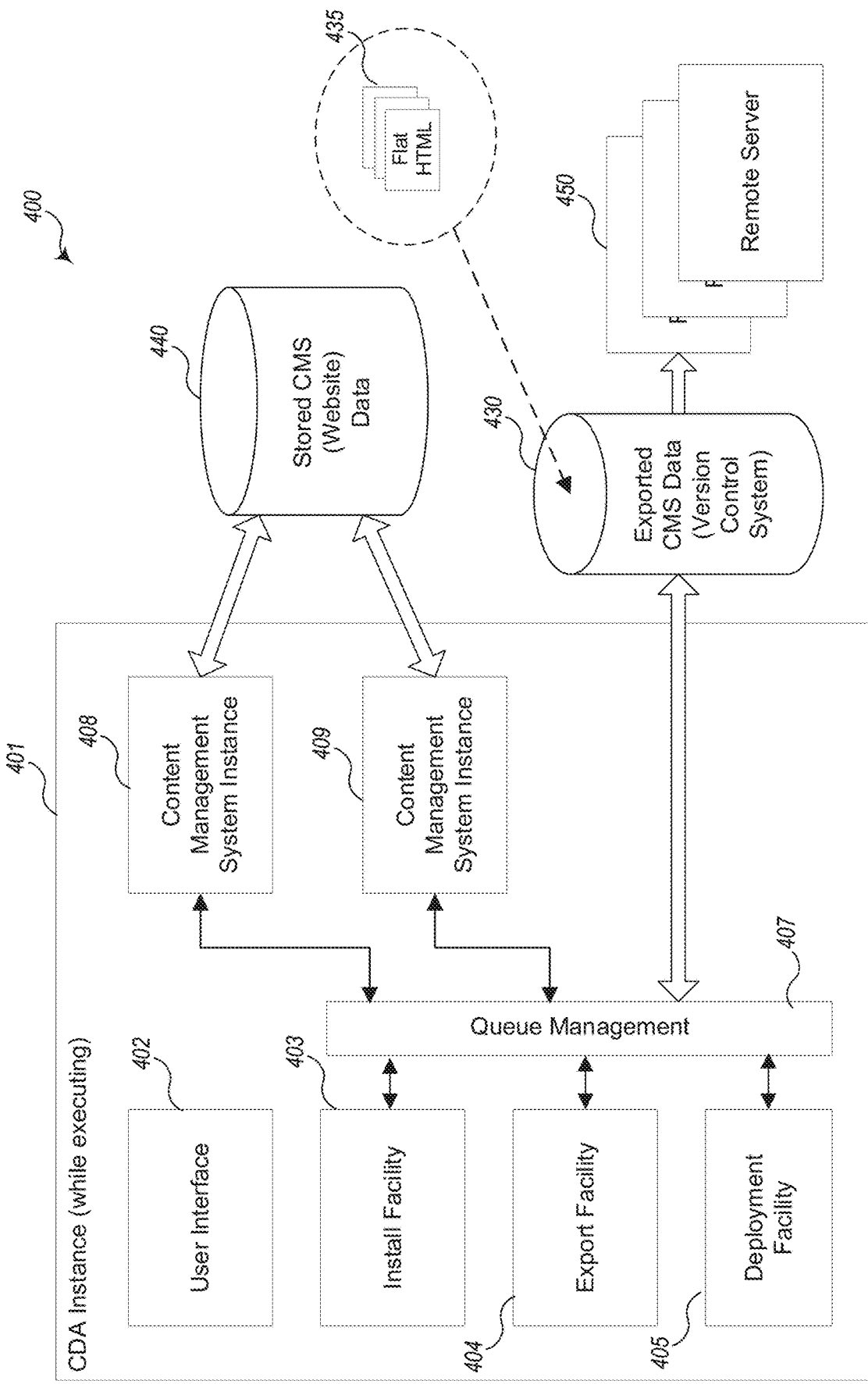
FIG. 4 is an example block diagram of components of an example CMS Deployment Application instance.

FIG. 4 is an example block diagram of components of an example CMS Deployment Application instance. In one example CDA environment, the CMS Deployment Application ("CDA") instance comprises one or more functional components/modules that work together to accomplish the website management functions described that far including creating/editing a website, exporting the website to an efficient and secure production form, and then deploying the exported website to a corresponding target server. FIG. 4 illustrates a CDA instance 401 while executing on a computing system (referred to here as a local computing system to differentiate it from a remote, publicly accessible server). It is understood that the CDA instance 401 may run physically or virtually on one of the computing systems also used to deploy publicly accessible websites.

Example CDA instance 401 includes a user interface 402, an install facility 403, an export facility 404, and a deployment facility 405. The user interface 402 operates to allow one or more users to use one or more CMS instances to create/modify websites and then export and deploy them. For example user interface 402 may operate to effectuate the display screens described with reference to FIGS. 3A-3U above. The install facility 403 is responsible for installing the one or more instances of (the same or different) CMS environments. The executing instance 401 shows two CMS instances 408 and 409 as already having been installed, with their corresponding CMS (website) data stored in one or more data repositories 440. The export facility 404 is responsible for transforming (converting, translating, configuring, and the like) the CMS based website into a format suitable for the production environment. The production files are stored as exported CMS data in data repository 430. Some CDAs employ a version control system to aid in tracking website versions so that certain actions, such as rollback to a prior version can be more easily accomplished. As described, the exported format is currently implemented as flat HTML files 435, although in the future other formats may be appropriate and supported. One feature desirable for such a format is an ability to run "light weight"—that is without the CMS environment or its resources. The deployment facility 405 is responsible for finalizing the exported format for a target server, such as by changing links and pathnames to refer to the server, and for copying of the finalized code to the target server (e.g., one of remote servers 450). One such deployment facility 405 uses the ftp protocol for transferring files and code although other protocols such as SSH (SFTP) and others may be also supported.

In some examples, CDA instance 401 also includes queue management 407 for processing some of the functions asynchronously to allow the various facilities greater responsiveness and coordination. For example, as described further below with respect to FIG. 6-9, the various facilities may use a queue management facility 407 to queue certain operations such as CMS instance installation, generation of the production files (upon export), and the like.

The techniques of a CDS/CDA are generally applicable to any type of content creation, management, export, and deployment. Also, although the examples described herein often refer to WORDPRESS, the techniques described herein can also be used with other CMS environments such as Drupal, Joomla, or Expression Engine. As well, any PHP-based or MySQL-based CMS would also be operable with the examples described herein. In addition, the concepts and techniques described are applicable to other production formats and protocols. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a CMS Deployment System or Application to be used facilitate creation and deployment of websites so as to reduce expertise needed to deploy them, to create more robust websites less permeable to hacking, and to be less resource heavy. Other embodiments of the described techniques may be used for other purposes. In the following description, numerous specific details are set forth, such as data formats and code sequences, etc., in order to provide a thorough understanding of the described techniques. The example embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 5:
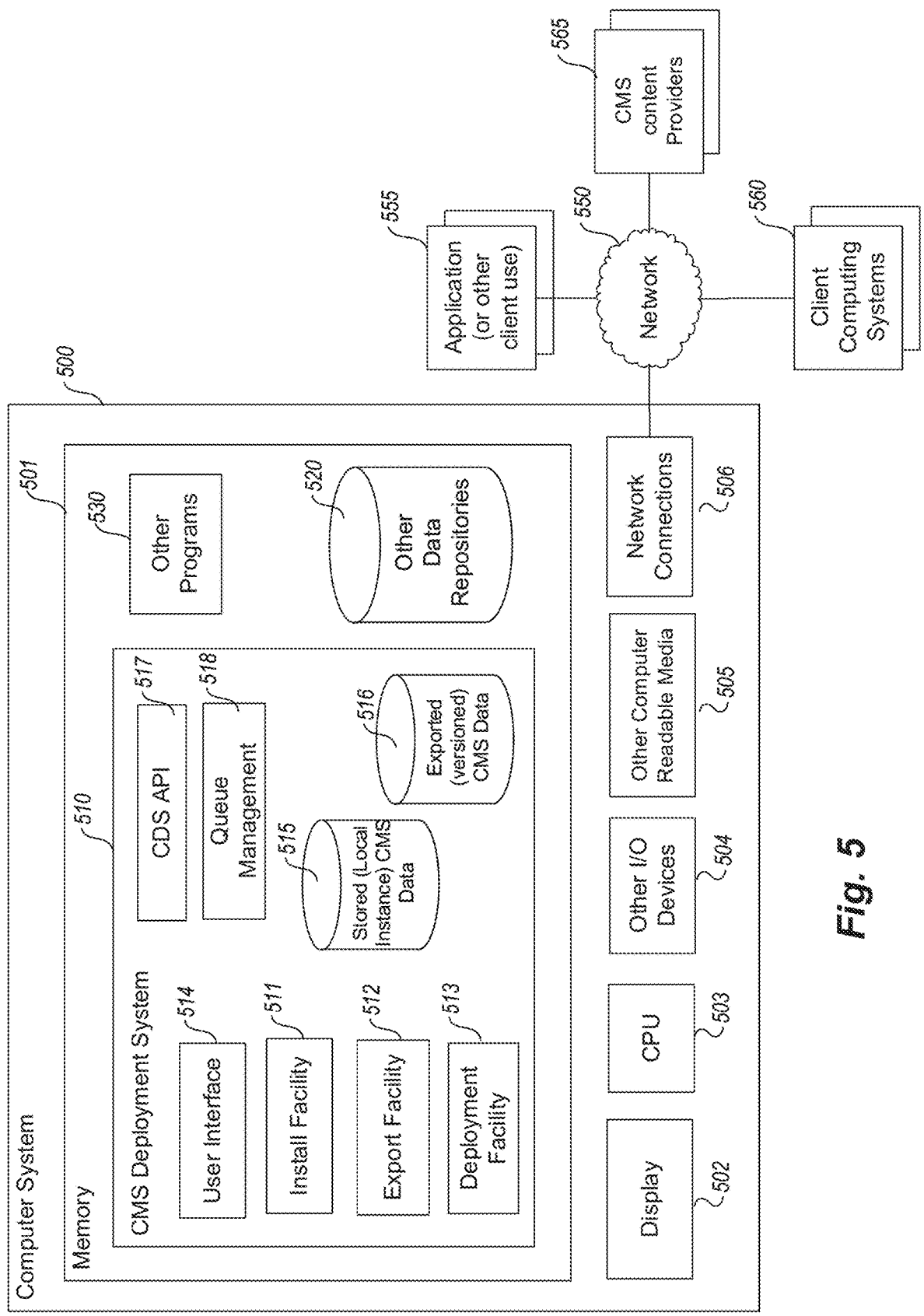
FIG. 5 is an example block diagram of a computing system for practicing embodiments of a CMS Deployment System/Application.

FIG. 5 is an example block diagram of a computing system for practicing embodiments of a CMS Deployment System/Application. Note that one or more general purpose virtual or physical computing systems suitably instructed or a special purpose computing system may be used to implement a CDS/CDA. Further, the CDS/CDA may be implemented in software, hardware, firmware, or in some combination to achieve the capabilities described herein.

Note that one or more general purpose or special purpose computing systems/devices may be used to implement the described techniques. However, just because it is possible to implement the CDS/CDA on a general purpose computing system does not mean that the techniques themselves or the operations required to implement the techniques are conventional or well known.

The computing system 500 may comprise one or more server and/or client computing systems and may span distributed locations. In addition, each block shown may represent one or more such blocks as appropriate to a specific embodiment or may be combined with other blocks. Moreover, the various blocks of the CDS/CDA 510 may physically reside on one or more machines, which use standard (e.g., TCP/IP) or proprietary interprocess communication mechanisms to communicate with each other.

In the embodiment shown, computer system 500 comprises a computer memory ("memory") 501, a display 502, one or more Central Processing Units ("CPU") 503, Input/Output devices 504 (e.g., keyboard, mouse, CRT or LCD display, etc.), other computer-readable media 505, and one or more network connections 506. The CDS/CDA 510 is shown residing in memory 501. In other embodiments, some portion of the contents, some of, or all of the components of the 510 may be stored on and/or transmitted over the other computer-readable media 505. The components of the CDS/CDA 510 preferably execute on one or more CPUs 503 and manage the generation, maintenance, and deployment of websites, as described herein. Other code or programs 530 and potentially other data repositories, such as data repository 520, also reside in the memory 501, and preferably execute on one or more CPUs 503. Of note, one or more of the components in FIG. 5 may not be present in any specific implementation. For example, some embodiments embedded in other software may not provide means for user input or display.

In a typical embodiment, the CDS/CDA 510 includes one or more user interfaces 514, one or more install facilities 512, one or more export facilities 513, and one or more deployment facilities 514. In addition, the CDS/CDA 510 typically includes CMS data stored locally in data repository 515 and exported versions of the website code and data in data repository 516. In some embodiments, one or more queue management facilities 518 are also provided. In at least some embodiments, access to the CDS/CDA is provided external to the CDS/CDA and is available, potentially, over one or more networks 550 via CDS application programming interface (API) 517. Other and/or different modules may be implemented. In addition, the CDS/CDA may interact via a network 550 with application or client code 555 or with one or more client computing systems 560 that uses exported website (production) format and/or deployed format for other functions such as to provide access to a third party version control system. The CDS/CDA may also interact via the network 550 with one or more third-party information provider systems 565, such as purveyors of content used in the websites and stored as CMS accessible data in CMS data repository 515. Also, of note, the data repositories 515 and 516 may be provided external to the CDS/CDA as well, for example in a knowledge base accessible over one or more networks 550.

In an example embodiment, components/modules of the CDS/CDA 510 are implemented using standard programming techniques. For example, the CDS/CDA 510 may be implemented as a "native" executable running on the CPU 103, along with one or more static or dynamic libraries. In other embodiments, the CDS/CDA 510 may be implemented as instructions processed by a virtual machine. In general, a range of programming languages known in the art may be employed for implementing such example embodiments, including representative implementations of various programming language paradigms, including but not limited to, object-oriented, functional, procedural, scripting, and declarative.

In one example implementation of the OneClick CDA described with reference to FIGS. 3A-3U, several known technologies and languages are used to implement the CDS/CDA 510, including PHP tools such as the Laravel; NPM, a package manager for Javascript and used to integrate Javascript; SASS preprocessing for producing optimized CSS code; Webpack for bundling assets; Redis as a message broker; Git as a version control system for tracking changes, including git-ftp for pushing changes to an ftp server such as the target servers. In other implementations, other tools and technologies, including those not yet existing, may be similarly and equivalently incorporated.

The example embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the CDS/CDA 510 (e.g., in the data repositories 516 and 517) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repositories 515 and 516 may be implemented as one or more database systems, file systems, or any other technique for storing such information, or any combination of the above, including implementations using distributed computing techniques.

Also, the example CDS/CDA 510 may be implemented in a distributed environment comprising multiple, even heterogeneous, computer systems and networks. Different configurations and locations of programs and data are contemplated for use with techniques of described herein. In addition, the CDS/CDA may be physical or virtual computing systems and may reside on the same physical system as the target server that hosts the target website. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an CDS/CDA.

Furthermore, in some embodiments, some or all of the components of the CDS/CDA 510 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

As described in FIGS. 1-4, one of the functions of a CDS/CDA is to deploy and manage websites created/modified using standard content management systems such as WORDPRESS.

Figure 6:
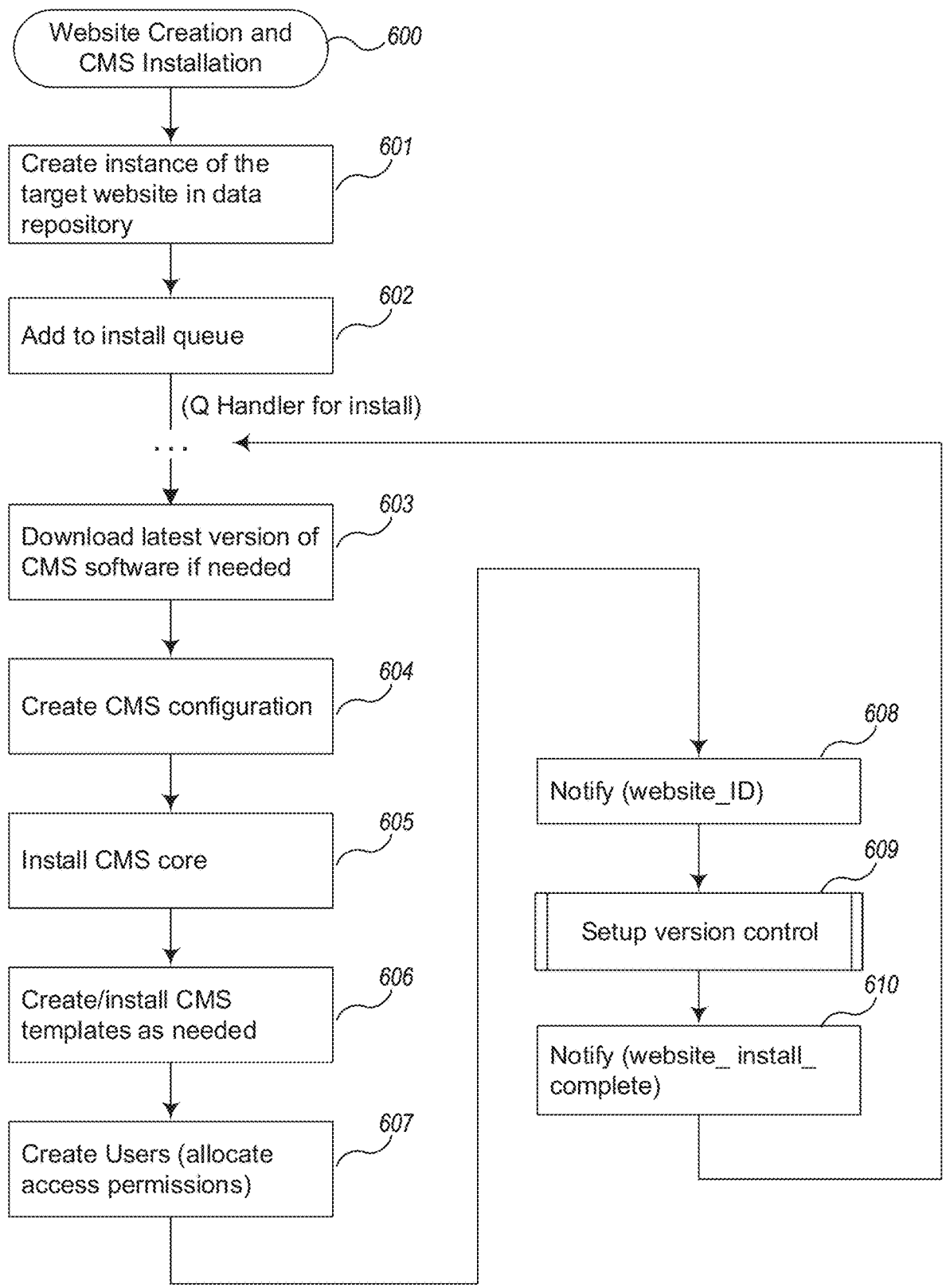
FIG. 6 is an example flow diagram of an example Website Creation and Content Management System installation routine provided by an install facility of a CMS Deployment System/Application to initially set up the website using a local CMS instance for use in creation of a target website.

FIG. 6 is an example flow diagram of an example Website Creation and Content Management System installation routine provided by an install facility of a CMS Deployment System/Application to initially set up the website using a local CMS instance for use in creation of a target website. This routine may be executed, for example, by the install facility 403 of FIG. 4, as part of the CDA instance 101 in FIG. 1. As described with respect to FIG. 3F, in one example CDS/CDA, the CDS/CDA first creates a website configuration and then installs an instance of the CMS locally— automatically, in response to a user creating a website and then selecting an install UI control. In overview, for each new website created, the CDS/CDA create one or more corresponding records in a data repository that correspond to the new website, installs a corresponding CMS instance locally, and sets up version control for the new website. The website creation and CMS installation logic 600 creates all of the folders required by the CMS and versioning software. The local website is then ready for editing.

Specifically, the website creation and CMS installation logic 600, in block 601, first creates an instance of the website in a data repository, such as data repository 440 in FIG. 4. In one example CDS/CDA, each CMS instance has its own data repository so that the data between CMS instances is isolated. All of the new website details are stored such as its name, location (URI/URL), server where it is to deploy, language, and the like. In block 602, the logic 600 then adds an indicator of the new website to an "installation" queue, for example, one managed by the queue management facility 407 in FIG. 4, to enable a background worker (e.g., a background task/process/thread) to perform a potentially time consuming install process. In some example CDS/CDA there are security mechanisms implemented to avoid users restarting the install if already queued. Although shown in the same flow diagram, it is understood that an appropriate install queue handler for the installation queue (the background worker for install) will retrieve and process the install event from the queue asynchronously, when appropriate. In block 603, the queue handler downloads a latest version of the specified CMS software (if needed), and in block 604 creates a new CMS configuration corresponding to the new website CMS instance. In block 605, the queue handler logic installs the CMS (e.g., WORDPRESS) core and configures it, for example, to include a user with admin privileges. In block 606, the queue handler logic creates/installs the CMS templates and any defaults specified by the CDS/CDA. In some example CDS/CDAs, default templates are configurable. In block 607, the queue handler logic creates any additional users depending upon the new website configuration setup and/or defaults. This logic allocates access permissions appropriate to each user. In block 608, after updating any other CMS configurations (not shown) such as disabling certain features (e.g., comments), the queue handler sends (forwards, reports, communicates, etc.) a notification of the identifier of the new website, for example, so that the user interface logic knows that the new website has been created and an identifier for later access. In block 609, the queue handler logic then sets up version control for the new website as described further with respect to FIG. 7. Once the version control setup is complete, the queue handler logic then sends a notification that the website installation process is completed. This notification is what allows, for example, the user interface to show that installation is completed in FIG. 3H, and allows the user interface to enable use of the CMS user interface to create/modify the new website's content.

Figure 7:
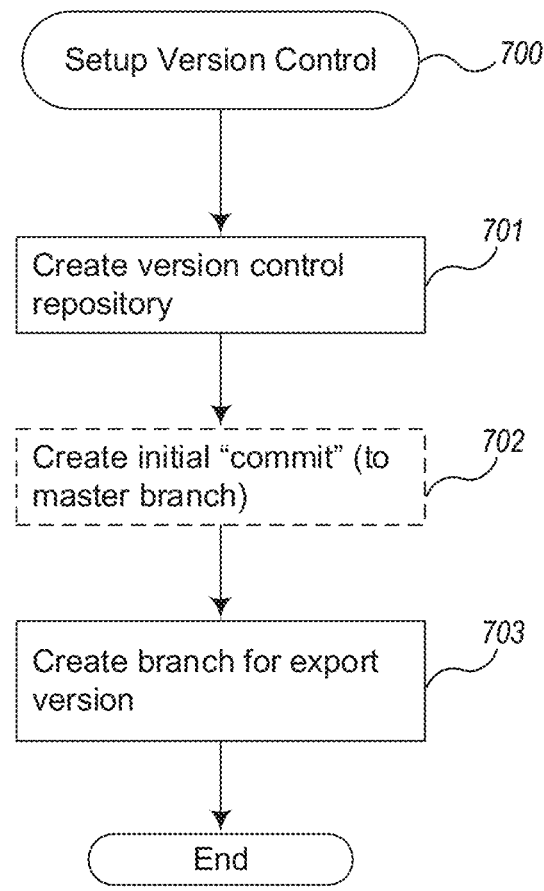
FIG. 7 is an example flow diagram of an example Setup Version Control routine provided by an install facility of a CMS Deployment System/Application to create an initial version of the target website for use in exporting the website.

FIG. 7 is an example flow diagram of an example Setup Version Control routine provided by an install facility of a CMS Deployment System/Application to create an initial version of the target website for use in exporting the website. This routine may be executed, for example, by the website creation and CMS installation logic 600 described with reference to FIG. 6. As illustrated, the version control logic 700 first creates a version control repository in block 701 specific to this CMS instance (e.g., the directory may be located in a directory such as " . . . /.gitdirs/[WEBSITE_ID] .git)." In an example CDS/CDA, GIT version control is used and two separate branches are created: a master branch for "ready to deploy" versions of the website (that are ultimately published to the target server and used during the deployment process) and an export branch to be used for all exports that are created. The export branch is also used for "preview" mode described with respect to the example user interface of FIGS. 3H and 3N. In block 702, the version control logic 700 performs a least one "commit" on the master branch using a placeholder file that can be ignored so that the logic can create a second (the export) branch. Other version control systems may not require this commit. In block 703, the version control logic 700 creates the export branch and then ends.

Figure 8:
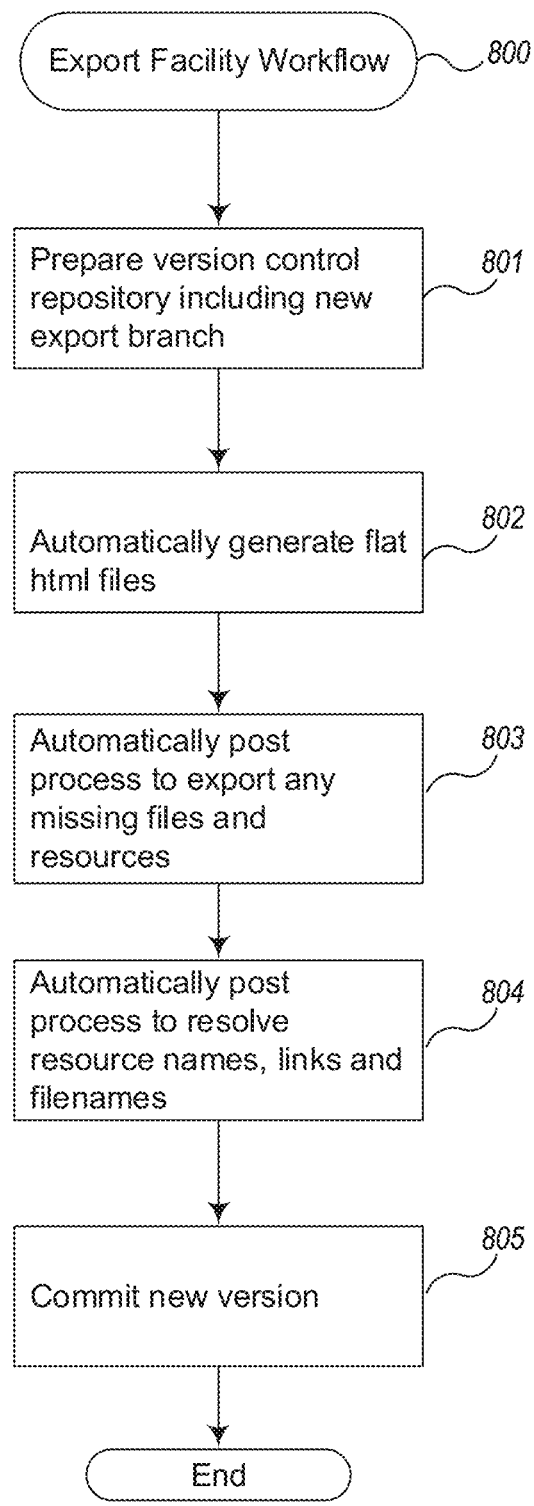
FIG. 8 is an example flow diagram of the workflow provided by an export facility of a CMS Deployment System/Application to export CMS content in a new version of a target website.

FIG. 8 is an example flow diagram of the workflow provided by an export facility of a CMS Deployment System/Application to export CMS content in a new version of a target website. This routine may be executed, for example, by the export facility 404 of FIG. 4, as part of the CDA instance 101 in FIG. 1. As described with respect to FIG. 3N, in one example CDS/CDA, after the website has been edited using the standard CMS installation user interface, the user can select an export UI control to cause the CDS/CDA export facility to transform the CMS website content to a production format more suitable for deployment. In the example CDS/CDA described, this format comprises flat HTML files, although other formats may be similarly and equivalently incorporated. In an example CDS/CDA, in overview, the CMS content is "scraped" using a scraping tool such as "wget," files, including related assets such as images, scripts, and stylesheets, are copied to the export branch, and file paths and other references are corrected as needed. Other scraping tools may be similarly and equivalently incorporated, including, for example, "aria2," "eget," "curl," "grab-site," and "wpull." After invoking the scraping tool to initially generate flat HTML corresponding to each page and copying them to a new export branch, the CDS/CDA loads each flat html page to a "headless" browser (no UI) and then monitors browser events to detect loading of resources and to track any missing (status 404) resources. The CDS/CDA then automatically postprocesses the scraped output and copies each of these missing files and assets from its CMS location to the export branch.

More specifically, FIG. 8 shows the export facility workflow/logic 800 of an example CDS/CDA. In block 801, the logic 800 prepares a version control repository to include a new export branch. This may involve resetting certain aspects of the repository configuration and/or emptying directories to clean the export branch so that unnecessary files are removed and so that the CDS/CDA can detect changes between versions.

In block 802, the export logic 800 generates the production format files—here flat HTML files. As mentioned, in an example CDS/CDA, this process is performed using a scraping tool such as wget, which enables the CDS/CDA to download and store all of the CMS webpages as flat HTML files as part of the CMS instance export branch.

In block 803, the export logic 800 postprocesses the flat HTML files (the instance stored in the export branch) to determine any missing files and resources by running the HTML through a headless browser. For example, some files and resources may not be detectable by a scraping tool that does not execute Javascript, which dynamically loads files and resources. For example, resources may be missing because the scraping tool did not detect them, such as lazy loaded images, some pagination results if managed using Javascript, and the like. Even though the wget scraping tool handles a recursive download (home page and all of the other pages linked to the homepage), it will not find these files since they are dynamically loaded at a future time. The export logic 800 can listen to the headless browser's events to detect such missing files and resources and then can locate and copy them to the stored export instance. For example, certain files will be searched for including a "robots.txt" file, sitemaps XML files locatable if there is a sitemap index found (the index can be searched to determine and export linked sitemap files), and any CMS specific folders that are known to contain files imported into the local CMS instance (e.g., for WORDPRESS, the folder "wp-content/upload" contains all of the uploaded media files). Dynamic files may be determined by loading the exported instance into a headless browser (such as "phantomJS" or Headless Chrome), and extracting the list of files that have been loaded after all of the scripts are executed. This list is compared to the list of files already in the exported instance. If a file is missing it is then copied to the export instance.

In block 804, the export logic 800 postprocesses resource names, links, filenames and the like to adjust pathnames as appropriate to be relative to the export instance instead of the CMS repository. (For example, with reference to FIG. 4, the pages in the exported data repository 430 need to be fixed to reference repository 430 and not repository 440.) Also, as an example, the flat HTML may include some files that are requested with query strings which will cause eventual errors if not renamed. This is common with WORDPRESS which adds query strings to all the assets. For example, the target website may contain the string: "style.css?v=123". The scraping tool will save this file as "style.css?v=123.css" but the real and needed filename is "style.css". To correct this and avoid errors, each such extracted filename is renamed without the query string. The postprocessing of block 804 is meant to address this and similar potential errors, without user intervention.

In block 805, the export logic 800 performs a version control "commit" action on the new version, and then ends. This commit detects and registers any changes from the current version of the target website (the deployed version) to the new export version. The updated website (target) is ready for deployment.

As described with reference to the example CDS/CDA user interface shown in FIGS. 3Q-3R, the user is given an opportunity to approve and/or verify the exported version (using a preview UI control and an approve UI control) before a deployment process is initiated. If the changes are rejected, then the CDS/CDA can roll them back to the pre-export state using standard version control software techniques. FIG. 3S shows the state of an example CDS/CDA after the changes are approved, after which the user can request deployment of the new version using, for example, a deploy UI control.

Figure 9:
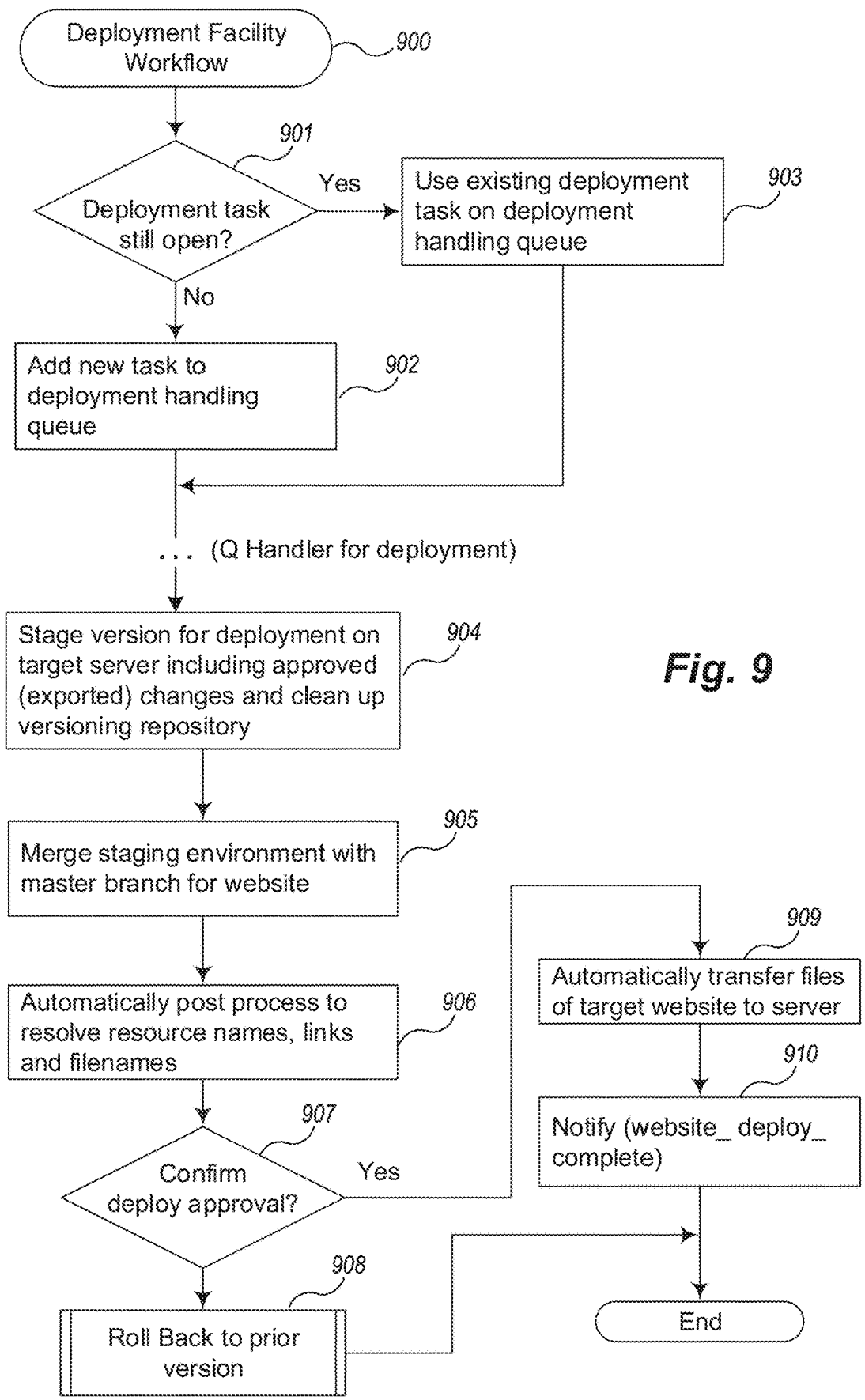
FIG. 9 is an example flow diagram of the workflow provided by an example deployment facility of a CMS Deployment System/Application to deploy a target website on a target server.

FIG. 9 is an example flow diagram of the workflow provided by an example deployment facility of a CMS Deployment System/Application to deploy a target website on a target server. This routine may be executed, for example, by the deployment facility 405 of FIG. 4, as part of the CDA instance 101 in FIG. 1.

Specifically, in block 901, the deployment workflow logic 900 first determines whether there is already a deployment task on the deployment handling queue underway for this CMS instance, and if so, uses the existing deployment task on the deployment handling queue (block 903) to process the next export; otherwise, adds a new task to the deployment queues (block 902). This synchronization is performed to maintain the integrity of the target website to reflect a single export version at a time. A queue handler processes the deployment queue asynchronously as a background worker, similar to that responsive to handling of the installation queue described with reference to FIGS. 6-7. In block 904, upon being triggered to process a deployment task from the deployment handling queue, the deployment queue handler stages a version for deployment on the associated target server including the approved (exported) changes, and then cleans up the versioning repository. In block 905, the deployment queue handler merges the stages version (which includes changed files and assets) with the master branch for the target website. In block 906, the queue handler automatically post processes the master branch files to resolve incongruities with resource and asset names, links, and filenames, to refer to the endpoint for the transfer (i.e., the target server URL) and not the export URL or the CDS/CDA local instance URL. In block 907, the queue handler determines whether the user has confirmed a desire to deploy the exported website. For example, FIG. 3T shows a dialog requesting a user to confirm a desire to deploy the current (exported) website. If so, the logic continues to block 909, otherwise continues in block 908. In block 908, the queue handler causes the version to be rolled back to the prior version using standard version system techniques, and then ends. If approval has occurred, then in block 909, the queue handler automatically (without further user intervention) transfers the files of the exported website to the target server. In one example CDS/CDA, the transfer is accomplished using GIT-FTP, which optimizes to only transfers changed files. Other mechanisms may be similarly and equivalently incorporated. In block 910, the queue handler sends notification that the target website has been successful deployed. The target website is then publicly available on the target server as demonstrated in FIG. 3U.

From the foregoing it will be appreciated that, although specific embodiments have been described herein for purposes of illustration, various modifications may be made without deviating from the spirit and scope of the invention. For example, the methods and systems for developing and deploying websites discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

All of the above U.S. patents, U.S. patent application publications, U.S. patent applications, foreign patents, foreign patent applications and non-patent publications referred to in this specification and/or listed in the Application Data Sheet, including but not limited to PCT/US2021/013752, entitled "AUTOMATED CREATION AND DEPLOYMENT OF WEBSITES," filed Jan. 15, 2021 and U.S. Provisional Patent Application No. 62/962,174, entitled "AUTOMATED CREATION AND DEPLOYMENT OF WEBSITES," filed Jan. 16, 2020, are incorporated herein by reference, in their entireties.

The invention claimed is:

1. A computer-implemented method for facilitating automated creation and deployment of a website configured for public access, comprising:
    automatically configuring a remote server for hosting a target website;
    associating the target website with a server name and a network resource identifier of the configured remote server;
    in response to an indication of selection of a user interface control, automatically configuring the target website on behalf of a user by:
        installing an instance of a content management software ("CMS") system locally in a computer system that is distinct from the remote server, the CMS system configured to provide resources, a front end user interface for viewing content stored in the CMS system, and a back-end user interface for creating, modifying, and/or administering the content stored in the CMS system; and
        associating the installed CMS system instance with the target website;
    in response to receiving indication of a selection of the back-end user interface or the front-end user interface, invoking the installed CMS system instance to create, modify, and/or administer the content for the installed CMS system instance;
    in response to selection of a first single user interface control, exporting the entire installed CMS system instance to produce an exported version of the installed CMS system instance, the exported version configured as a flat html content to enable the content stored in the installed CMS system instance to be presented on a remote server distinct from the installed CMS system instance, wherein references and resources are automatically retargeted to a location of the remote server without user intervention; and
    in response to indication of selection of a second single user interface control, automatically deploying the exported version of the entire website as the target website on the remote server, the deployed target website presenting the flat html content independent of the installed CMS system.

2. The method of claim 1, wherein the exporting the installed CMS system instance to produce the exported version of the CMS system instance further comprises:
    without user intervention,
        using a software content retrieval tool, automatically scraping the CMS system instance to provide an initial html content;
        automatically reviewing the initial html content to detect missing resources, files, and/or pages; and
        automatically causing download of any detected missing content to supplement the initial html content to produce the exported version.

3. The method of claim 2, wherein the software content retrieval tool is at least one of: wget, aria2, aget, curl, grab-site, and/or wpull.

4. The method of claim 2, wherein the software content retrieval tool is a command line tool configured to retrieve, crawl, and/or download content for offline viewing.

5. The method of claim 2, wherein the missing content includes one or more of assets, data, and/or files dynamically downloaded by the CMS system instance through scripts, stylesheets, or dynamically executed code.

6. The method of claim 1, wherein the exporting the installed CMS system instance to produce the exported version of the CMS system instance further comprises:
    resolving links to refer to location of the remote server.

7. The method of claim 1, wherein the CMS system instance is a WORDPRESS software instance, a content management software system that is based upon PHP and/or MYSQ, or at least one of DRUPAL, JOOMLA!, and/or EXPRESSIONENGINE software.

8. The method of claim 1, wherein the automatically configuring the remote server is performed in response to entry of an associated server name, a protocol designation, a port identifier, and user credentials.

9. The method of claim 1, wherein the remote server is configured as an ftp server.

10. The method of claim 1, further comprising:
    storing the exported version of the CMS system instance in a version control system.

11. The method of claim 10, further comprising:
    using the version control system to automatically deploy an approved version of the exported version as the target website on the remote server; and/or
    using the version control system to automatically roll back the target website to a prior exported version of the CMS system instance.

12. A computer system comprising:
    a computer processor;
    a memory; and
    a website deployment component, comprising a content management system access tool, an export facility, and a deployment facility that are stored in the memory and configured, when executed by the computer processor, to
        upon an indication of selection of a single user interface control of the deployment component, automatically configure a target website on behalf of a user using the content management system access tool by:
            installing an instance of a content management ("CM") system locally on the computer system that is distinct from the remote server, the CM system configured to provide resources, a front-end user interface for viewing content stored in the CM system, and a back-end user interface for creating, modifying, and/or administering the content stored in the CM system; and
            associating the installed CM system instance with the target website;
        upon an indication of selection of the back-end user interface or the front-end user interface of the installed CM system instance, invoke the installed CM system instance to create, modify, and/or administer the content for the installed CM system instance;
        export the installed CM system instance to provide flat html content as an export version using the export facility, the export version structured to execute, independent of the CM system, on a remote server by automatically, without user intervention, retargeting references and resources to a location of the remote server; and
        upon indication of selection of a single user interface control of the deployment component, automatically deploy the exported version of the en re website as the target website on the remote server using the deployment facility, the deployed target website presenting the flat html content without executing any resources or code of the CM system.

13. The computer system of claim 12, wherein the website deployment component further comprises:
a software content retrieval tool configured to, without user intervention:
automatically scrape the CM system instance to retrieve an initial html content;
automatically review the initial html content to detect missing resources, files, and/or pages; and
automatically cause retrieval of any detected missing content to supplement the initial html content to produce the exported version.

14. The computer system of claim 12, wherein the website deployment component further comprises:
an component structured to configure the remote server using an associated server name, a protocol designation, a port identifier, and user credentials.

15. The computer system of claim 12, wherein the website deployment component is structured to accommodate multiple users modifying and/or exporting the CM system instance.

16. The computer system of claim 13, wherein the missing content includes one or more of assets, data, and/or files dynamically downloaded by the CM system.

17. The computer system of claim 13, wherein the software content retrieval tool is a command line tool configured to retrieve, crawl, and/or download content for offline viewing and/or wherein the software content retrieval tool is configured to operate on a LINUX-based or WINDOWS-based operating system.

18. The computer system of claim 12, wherein the CM system is a content management software system constructed using WORDPRESS.

19. The computer system of claim 12, wherein the CM system instance is at least one of DRUPAL, JOOMLA!, and/or EXPRESSIONENGINE software.

20. The method of claim 10, wherein changes to the content stored in the CMS system are provided by a plurality of users at the same or different times and using the version control system to maintain coherence and/or consistency of the content.

21. The computer system of claim 12, wherein the export facility is further configured to store the exported version of the CMS system instance in a version control system and use the version control system to automatically deploy an approved version of the exported version as the target website on the remote server, and/or to automatically roll back the target website to a prior exported version of the CM system instance.

22. A non-transitory computing-readable memory medium storing instructions for controlling a computer processor, when executed, to facilitate automated creation and deployment of a website configured for public access by performing a method comprising:
automatically configuring a remote server for hosting a target website;
associating the target website with a server name and a network resource identifier of the configured remote server;
in response to an indication of selection of a user interface control, automatically configuring the target website on behalf of a user by:
installing an instance of a content management software ("CMS") system locally in a computer system that is distinct from the remote server, the CMS system configured to provide resources, a front-end user interface for viewing content stored in the CMS system, and a back-end user interface for creating, modifying, and/or administering the content stored in the CMS system; and
associating the installed CMS system instance with the target website;
in response to receiving indication of a selection of the back-end user interface or the front-end user interface, invoking the installed CMS system instance to create, modify, and/or administer the content for the installed CMS system instance;
exporting the installed CMS system instance to produce an exported version of the installed CMS system instance, the exported version configured as a flat html content to enable the content stored in the installed CMS system instance to be executed and presented remotely from the installed CMS system instance by automatically without user intervention, retargeting references and resources to a location of the mote server; and
in response to indication of a single user interface control selection, automatically deploying the exported version of the entire website as the target website on the remote server, the deployed target website presenting the flat html content independent of the installed CMS system.

* * * * *